United States Patent [19]
Sato et al.

[11] Patent Number: 5,812,146
[45] Date of Patent: Sep. 22, 1998

[54] IMAGE PROCESSING APPARATUS USING COMPRESSED DATA PROCESSING

[75] Inventors: Mamoru Sato, Tokyo; Hidefumi Osawa, Urawa; Naoto Kawamura, Yokohama, all of Japan

[73] Assignee: Canon Kabushiki Kaisha, Tokyo, Japan

[21] Appl. No.: 977,046

[22] Filed: Nov. 25, 1997

Related U.S. Application Data

[60] Continuation of Ser. No. 602,469, Feb. 16, 1996, abandoned, which is a division of Ser. No. 112,374, Aug. 27, 1993, which is a division of Ser. No. 506,550, Apr. 6, 1990, abandoned, which is a continuation of Ser. No. 940,395, Dec. 11, 1986, abandoned.

[30] Foreign Application Priority Data

| Dec. 13, 1985 | [JP] | Japan | 60-281631 |
| Dec. 13, 1985 | [JP] | Japan | 60-281632 |
| Dec. 13, 1985 | [JP] | Japan | 60-281633 |
| Dec. 13, 1985 | [JP] | Japan | 60-281634 |
| Dec. 14, 1985 | [JP] | Japan | 60-281537 |

[51] Int. Cl.⁶ ............................................. G06F 15/00
[52] U.S. Cl. ............................................................ 345/501
[58] Field of Search ................................... 345/428, 436, 345/501, 433, 429

[56] References Cited

U.S. PATENT DOCUMENTS

| 3,188,386 | 6/1965 | Byatt | 178/6.8 |
| 3,483,511 | 12/1969 | Rabinow | 340/146.3 |
| 3,569,616 | 3/1971 | Baker | 178/6.8 |
| 3,629,495 | 12/1971 | Cahill | 178/6.6 A |
| 3,641,260 | 2/1972 | Herndon | 178/7.7 |
| 3,792,194 | 2/1974 | Wood et al. | 178/6.8 |
| 3,803,445 | 4/1974 | Wagner | 315/18 |
| 3,902,047 | 8/1975 | Tyler et al. | 235/61.11 |
| 3,922,059 | 11/1975 | Noguchi | 350/3.5 |

(List continued on next page.)

FOREIGN PATENT DOCUMENTS

| 0022490 | 1/1981 | European Pat. Off. . |
| 0081906 | 6/1983 | European Pat. Off. . |
| 0113410 | 7/1984 | European Pat. Off. . |
| 0149119 | 7/1985 | European Pat. Off. . |
| 0177640 | 4/1986 | European Pat. Off. . |
| 179292 | 4/1986 | European Pat. Off. . |
| 0188678 | 7/1986 | European Pat. Off. . |
| 0216501 | 4/1987 | European Pat. Off. . |
| 0221418 | 5/1987 | European Pat. Off. . |
| 0239119 | 9/1987 | European Pat. Off. . |

(List continued on next page.)

OTHER PUBLICATIONS

"Rotation of Images Using Contour Compressed Data", T.H. Morin, IBM Tech. Discl. Bul., vol. 18, No. 8, Jan. 1976, pp. 2640–2642.

"Recursive Contour Coding of Nested objects in Black/White Images", T.H. Morin, II, IEEE, International Conference on Communications, vol. 1, pp. 7–17 to 7–21, 1975.

"Parallel Linear Transformations on Two–Dimensional Binary Images", R.G. Casey et al., IBM Tech. Discl. Bul., vol. 13, No. 11, Apr. 1971, pp. 3267–3268.

"Shift Register System For Image Orientation", D.E. Gold et al., IBM Tech. Discl. Bul., vol. 18, No. 8, Jan. 1976, pp. 2633–2639.

Han et al., "The Application of an Image–Compressiong/Feature–Transgeneration Techinque to the Computer–Aided Diagnosis of Brain Tumors", in IEEE Transaction on Systems, Man & Cybernetics, Jul. 1973, pp. 410–415.

*Primary Examiner*—Phu K. Nguyen
*Attorney, Agent, or Firm*—Fitzpatrick, Cella, Harper & Scinto

[57] ABSTRACT

There is disclosed an image processing apparatus in which original image data are compressed by encoding to a smaller quantity, then the image processing is conducted in such compressed form, and thus processed data are released with a high resolving power and a satisfactory tonal rendition. In this manner highly advanced image processing can be achieved with a limited memory capacity.

12 Claims, 37 Drawing Sheets

U.S. PATENT DOCUMENTS

| | | | |
|---|---|---|---|
| 3,925,765 | 12/1975 | Berwin et al. | 340/172.5 |
| 3,959,582 | 5/1976 | Law et al. | 178/6.8 |
| 3,968,475 | 7/1976 | McMahon | 340/146.3 |
| 3,976,872 | 8/1976 | Peterson et al. | 250/211 R |
| 3,976,982 | 8/1976 | Eiselen | 340/172.5 |
| 4,052,699 | 10/1977 | Micka et al. | 340/146.3 |
| 4,134,128 | 1/1979 | Hurst | 358/22 |
| 4,168,488 | 9/1979 | Evans | 340/146.3 H |
| 4,225,929 | 9/1980 | Ikeda | 364/521 |
| 4,245,321 | 1/1981 | Gennetten | 364/521 |
| 4,281,312 | 7/1981 | Knudson | 340/146.3 MA |
| 4,291,380 | 9/1981 | Rohner | 364/522 |
| 4,360,876 | 11/1982 | Grault et al. | 369/449 |
| 4,415,922 | 11/1983 | Reymard et al. | 358/12 |
| 4,533,910 | 8/1985 | Sokonick et al. | 340/721 |
| 4,538,183 | 8/1985 | Kanno et al. | 358/280 |
| 4,580,134 | 4/1986 | Campbell et al. | 340/703 |
| 4,580,231 | 4/1986 | Tidd et al. | 364/521 |
| 4,593,407 | 6/1986 | Konishi et al. | 382/46 |
| 4,628,344 | 12/1986 | Glenn | 258/12 |
| 4,633,503 | 12/1986 | Hinman | 382/47 |
| 4,636,783 | 1/1987 | Omachi | 340/727 |
| 4,646,076 | 2/1987 | Wiedenman et al. | 340/747 |
| 4,661,987 | 4/1987 | Anderson et al. | 382/41 |
| 4,663,615 | 5/1987 | Hernandez et al. | 340/721 |
| 4,719,503 | 1/1988 | Craver et al. | 358/12 |
| 4,736,307 | 4/1988 | Salb | 364/518 |
| 4,743,959 | 5/1988 | Frederikson | 358/11 |
| 4,760,459 | 7/1988 | Sato et al. | 358/260 |
| 4,783,831 | 11/1988 | Kashioka et al. | 382/34 |
| 4,797,944 | 1/1989 | Tanaka | 382/56 |
| 4,809,350 | 2/1989 | Shimoni et al. | 382/56 |
| 4,850,028 | 7/1989 | Kawamura et al. | 382/46 |
| 4,918,541 | 4/1990 | Ishida et al. | 358/433 |
| 4,929,085 | 5/1990 | Kajihara | 364/518 |
| 5,028,995 | 7/1991 | Izawa et al. | 358/105 |
| 5,041,992 | 8/1991 | Cunningham et al. | 395/135 |
| 5,063,375 | 11/1991 | Lien et al. | 340/703 |
| 5,121,470 | 6/1992 | Trautman | 349/140 |
| 5,153,936 | 10/1992 | Morris et al. | 395/128 |
| 5,327,509 | 7/1994 | Rich | 382/17 |
| 5,428,725 | 6/1995 | Sugai et al. | 395/136 |
| 5,471,577 | 11/1995 | Lightbody et al. | 395/157 |

FOREIGN PATENT DOCUMENTS

| | | |
|---|---|---|
| 3801570 | 1/1987 | Germany . |
| 3706470 | 2/1987 | Germany . |
| 58-159184 | 9/1983 | Japan . |
| 60-16766 | 1/1985 | Japan . |
| 62-190969 | 8/1987 | Japan . |
| 2-17766 | 1/1990 | Japan . |
| 0573149 | 11/1973 | Switzerland . |
| 1537328 | 12/1978 | United Kingdom . |
| 1551229 | 8/1979 | United Kingdom . |
| 2024581 | 1/1980 | United Kingdom . |
| 2073995 | 10/1981 | United Kingdom . |

$l = \alpha(|\sin\theta| + |\cos\theta|)$
$m = \beta(|\sin\theta| + |\cos\theta|)$

FREE-SHAPED MASK

FIG. 20
PATTERN 0 
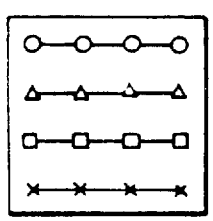
PATTERN 1 
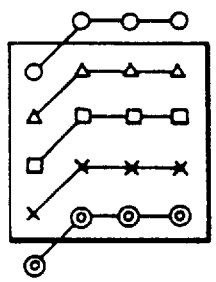
PATTERN 2 
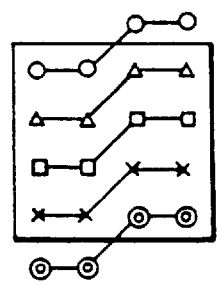
PATTERN 3 
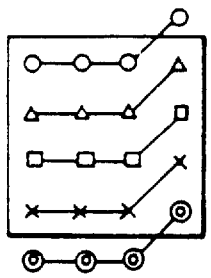
PATTERN 4 
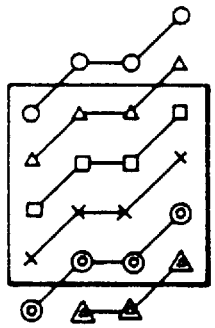
PATTERN 5 
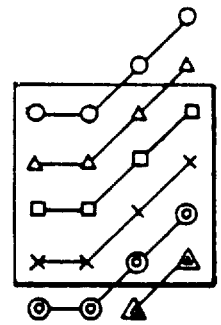
PATTERN 6 
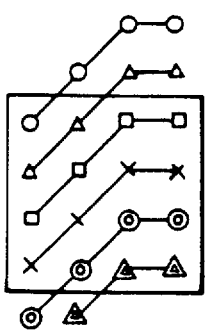
PATTERN 7 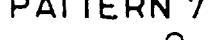
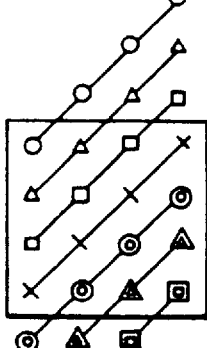

FIG. 21A

| BLOCK ADDRESS (COLUMN) | n-1 | n | n+1 | n+2 | |
|---|---|---|---|---|---|
| FLAG MEMORY | i | i-1 | i-1 | i-2 | |
| 2-BLOCK BUFFER MEMORY  φ(ROW) | | ○ | | ○ ○ | |
| 2-BLOCK BUFFER MEMORY  1(ROW) | ○ ○ | ○ ○ ○ ○ | ○ ○ | ○ ○ ○ ○ | ○ |

FIG. 21B

| BLOCK ADDRESS (COLUMN) | n-1 | n | n+1 | n+2 | |
|---|---|---|---|---|---|
| FLAG MEMORY | i | i-1 | i-1 | i-2 | |
| 2-BLOCK BUFFER MEMORY  φ(ROW) | | △ □ □ □ | ⊙ | □ □ ⊙ ⊙ | |
| 2-BLOCK BUFFER MEMORY  1(ROW) | ○ ○ △ △ □ | ○ ○ ○ ○ △ △ □ | ○ ○ △ △ △ △ □ □ | ○ ○ △ ○ ○ △ □ △ △ □ | ○ △ □ |

ORIGINAL IMAGE

BLOCK ROTATION

BLOCK ROTATION

IMAGE PROCESSING APPARATUS USING COMPRESSED DATA PROCESSING This application is a continuation of application Ser. No. 08/602,469 filed Feb. 16, 1996, now abandoned; which is a divisional application of Ser. No. 08/112,374, filed Aug. 27, 1993, which is a divisional application of Ser. No. 07/506,550 filed Apr. 6, 1990, now abandoned; which is a continuation application of Ser. No. 06/940,395 filed Dec. 11, 1986 now abandoned.

BACKGROUND OF THE INVENTION

1. Field of the Invention

The present invention relates to an apparatus for processing image information.

2. Related Background Art

Conventional image processing apparatus have been very expensive, and large in size, and require a long processing time, so that they could only be used as printing systems. Examples of such expensive apparatus are the Response 300 series manufactured by Scitex, and the Studio-800 series manufactured by Crossfield.

In general an image editing apparatus requires two editing functions:

1. high-speed processing with a hardware circuit; and
2. software processing with a CPU.

The former is achieved by hardware generally called a pipeline processor, and is applied to certain items of image processing requiring a high speed. On the other hand, the latter process with a CPU is applied to certain items conducted in an interactive manner with the operator, with a certain processing time.

More specifically, said pipeline processor is principally applied to successive image processing, such as affine conversion (enlargement, reduction, displacement or rotation) for determining the image layout, spatial filtration (image enhancement or smoothing) and color conversions with a look-up table.

On the other hand, the latter CPU processing is generally applied to complex processes or those which cannot be easily implemented as hardware. More specifically there are included extraction of an image of an arbitrary shape, copying of a thus extracted image to another location, and a partial correction of an image. These processes generally require creativity of the operator and can tolerate a certain processing time, but this processing function is required to be highly advanced.

The image editing apparatus should be designed from its system architecture, in order to achieve the above-mentioned two editing functions with maximum performance. More specifically in order to achieve these functions satisfactorily with a high speed, it is necessary to consider the structure of the system, the data format to be handled, the flow of signals, the construction of functions, etc.

Various investigations have led to the following features as the system architecture of a color image processing apparatus:

(1) For achieving image processing, the image data should be maintained as compressed data;
(2) For signal compression is preferred is a vector quantization in which an m×m block is represented by a code; and
(3) Hardware processing is most reasonably conducted as a successive processing upon signal transfer in signal reading, for example from a rigid disk.

With respect to (1), image editing processing with a high resolving power and a high tonal rendition requires an enormous memory capacity. As an example, if a page of A4-sized color image is read with a resolving power of 16 pel/mm, there is required a data capacity of ca. 48 Mbyte for three colors of red, green and blue. For achieving the above-mentioned interactive image processing in satisfactory manner, it is important to compress such color image data into a form suitable for processing. For this purpose the vector quantization, mentioned in (2), has been concluded to be optimum.

In a high-speed hardware processing mentioned in (3), a longer processing time will be required if the processing is conducted in two steps, i.e. a transfer step of the data from a file such as a rigid disk to a memory and a processing step for hardware-processing data stored in the memory. On the other hand, a higher speed in processing will become possible if the processing is conducted simultaneously with the transfer step.

SUMMARY OF THE INVENTION

In consideration of the foregoing, an object of the present invention is to provide an image processing apparatus of a high image quality, an advanced function and a high speed.

Another object of the present invention is to provide an image processing apparatus capable of compressing image data of a large amount obtained by reading an image with a high resolving power into a form suitable for image editing, effecting correction or editing on such compressed image data in the editing operation, and releasing the result of such processing with a high resolving power and a satisfactory tonal rendition.

Still another object of the present invention is to provide an image processing apparatus capable of storing block encoded image information in a memory, utilizing a part of such codes as display information and utilizing decoded information for recording.

Still another object of the present invention is to provide an image processing apparatus capable of synthesizing images of plural pages, obtained from a memory storing image information of plural pages, on a display device.

Still another object of the present invention is to provide a color image processing apparatus capable of an encoding, in which color information of a block composed of plural pixels is represented by color information of a predetermined number less than the number of pixels constituting said block.

Still another object of the present invention is to provide a color image processing apparatus capable of converting a predetermined color of an area of various shapes into another color.

The foregoing and still other objects of the present invention will become fully apparent from the following detailed description, which is to be taken in conjunction with the attached drawings.

BRIEF DESCRIPTION OF THE DRAWINGS

FIG. 20 is a view showing examples of a code block and orders of processing;

FIGS. 21A and 21B are showing the mode of storage in a re-encoding block buffer memory;

DETAILED DESCRIPTION OF THE PREFERRED EMBODIMENTS

First Embodiment

Figure 1:
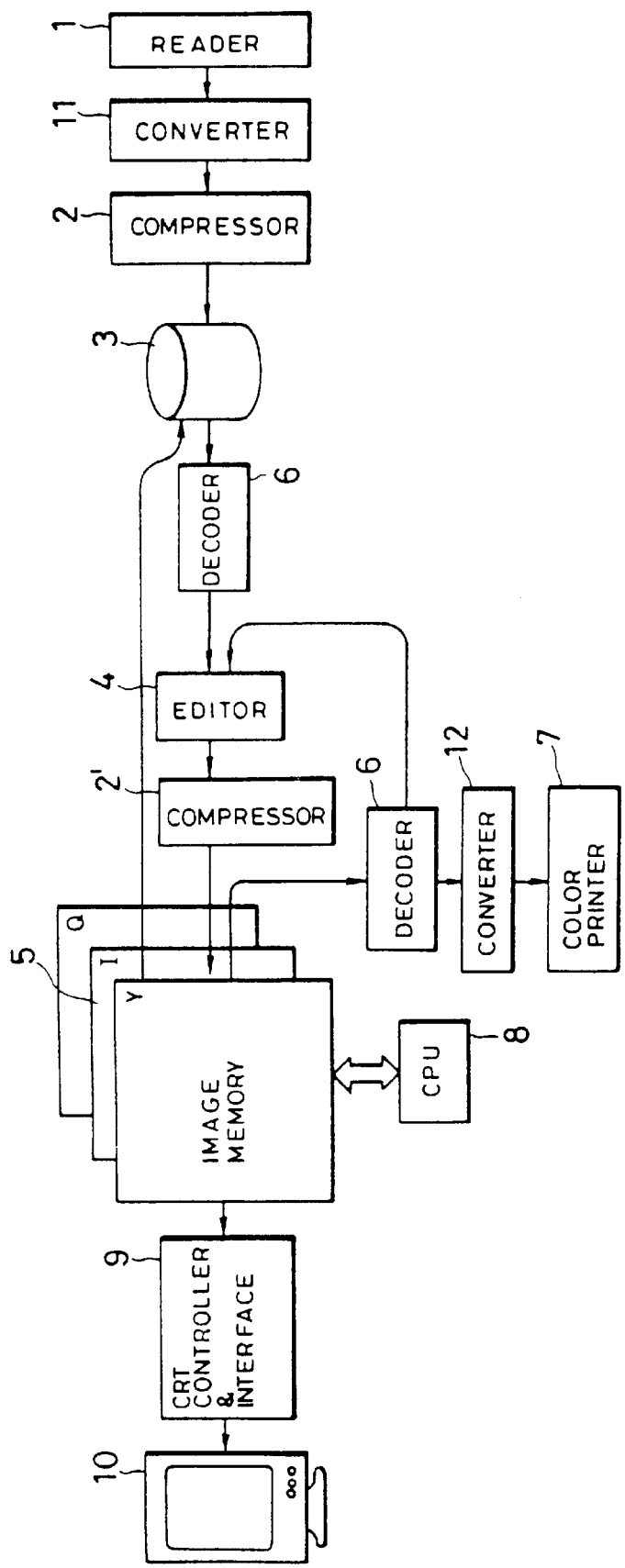
FIG. 1 is a schematic view of an image processing apparatus constituting a first embodiment of the present invention.

FIG. 1 illustrates a first embodiment of the present invention wherein are shown a reader 1 for reading an original image with a high resolving power and with multiple density levels (a digital value of 2 bits or more); a compressor 2 and a second compressor 2' for encoding image data; a memory 3 of a large capacity for temporarily storing the encoded image data or the data after a processing and before another processing; an editing pipeline processor for editing input image data in raster form obtained from the memory 3; a random access image memory 5 for storing the results of processing; a decoder 6 for decoding the encoded data into other data of a high resolving power and of multiple density levels; a CPU 8 for controlling the entire apparatus and applying fine processing to the image data; a CRT interface 9 for supplying a cathode ray tube 10 with encoded data; a color cathode ray tube 10; a converter 11 for converting the signal from the reader 1 into a standard color signal; and a converter 12 for converting the standard color signal into a signal for a printer 7. Since the decoder 6 and the compressor 2 are respectively placed in front of and after the editing processor 4, the latter can directly handle pixel data of a high resolving power and multiple density levels, thereby being capable of detailed image processing.

On the other hand, as said editing processor is designed to process the image data entered in the sequence of rasters, the memory 3 need not be an expensive random access memory but can be, for example, a rigid disk memory. Also the input data from the reader may be directly supplied to the editing processor 4, without going through the memory 3. On the other hand, in the use of a memory such as a rigid disk memory, the amount of data is compressed significantly, so that the performance of the entire apparatus can be improved even if the transfer rate of said memory is low.

Figure 2:
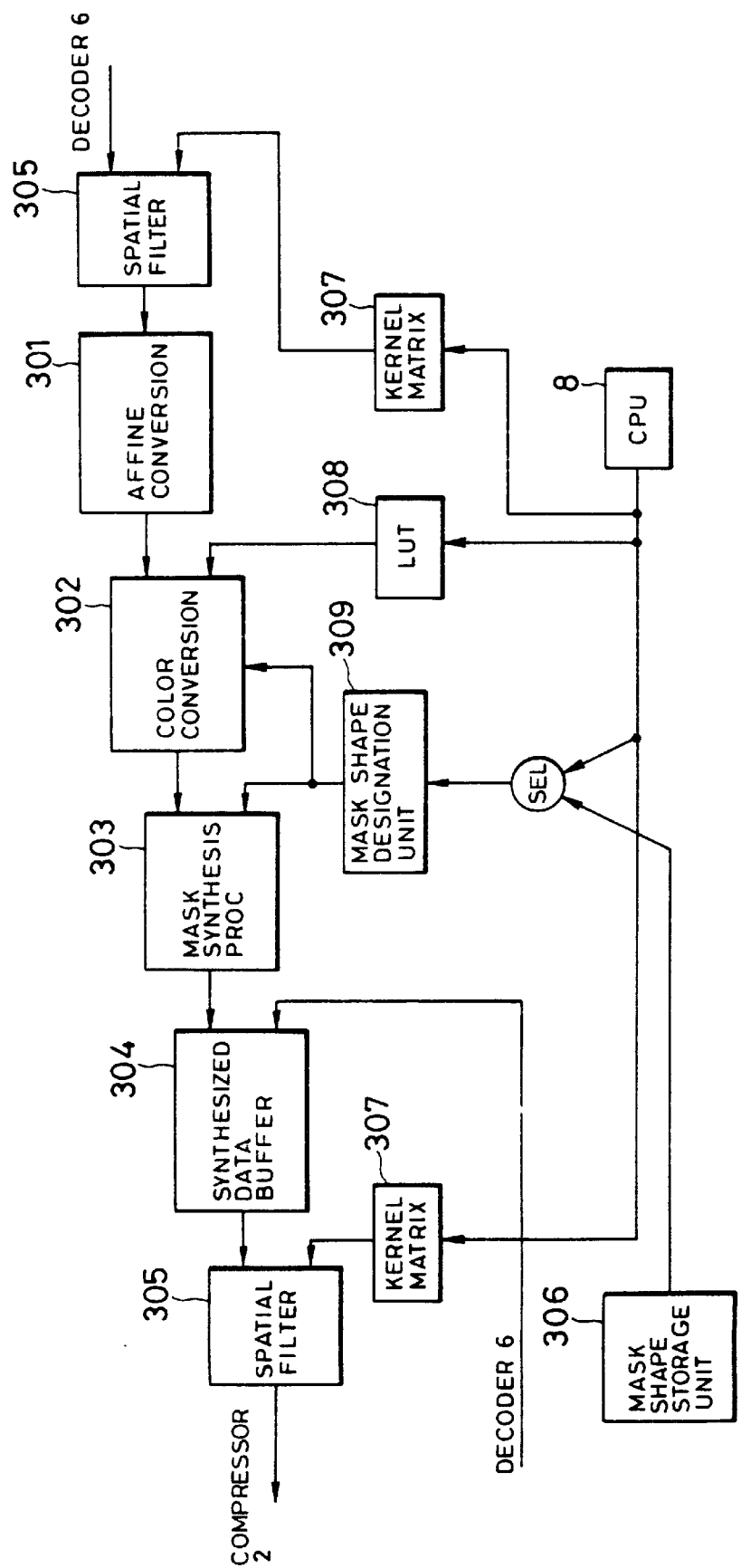
FIG. 2 is a block diagram of an editor unit.

In the following there will be explained a process conducted in the editing processor 4. FIG. 2 illustrates an example of the editing process, wherein are provided are an affine processor 301 for affine and perspective conversions; a color conversion processor 302 for designating an arbitrary color and converting said color into another color; a mask synthesis processor 303 for extracting images with masks and synthesizing said images; a synthesis data buffer 304 for reading a background image to be synthesized from an image memory 5, decoding said image with the decoder 6, temporarily storing said image, adding image data to be superposed and temporarily storing the resulting image; a spatial filter processor 305 for spatial filter processing such as smoothing or edge enhancement; a mask shape memory 306 for enabling superposition of an arbitrary shape; a kernel matrix 307 for a spatial filter 305 instructed by the CPU or by data transfer; a color conversion look-up table 308 instructed by the CPU 8 or by data transfer; and a mask shape designating unit 309 so constructed as to generate masks of simple shapes in a logic circuit, without relying on the mask shape memory 306. The mask data from said mask shape designation unit 309 may be also supplied to the color conversion processor 302 to enable color conversion of a particular area. In FIG. 2, raster image data decoded in the decoder 6 are subjected to a preliminary processing in the spatial filter processor 305, and then to change in image magnification, a rotation or a perspective processing in the affine conversion processor 301. The affine converted image data are subjected to a color conversion in the color conversion processor 302, then to an extraction in the mask synthesis processor 303, and are then synthesized, in the synthesis data buffer 304, with a background image decoded in advance in the decoder 6. The synthesized image is subjected to a post-processing in the spatial filter processor 305, then encoded in the compressor 6 and stored in the image memory 5. In the above-mentioned process, either or both of two spatial filters may be dispensed with, and the sequence of processing with various processors is not determined uniquely. For example the color conversion processor may be positioned in front of the affine conversion processor 301 and behind the decoder 6 to reduce the noise in the re-sampling operation conducted in the affine conversion processor 301. Also the spatial filter processor 305 may be so positioned as to function simultaneously with the re-sampling of the affine conversion processor.

In the following there will be explained processes conducted in the affine conversion processor, i.e., enlargement, reduction, displacement or rotation of an image.

Among: the address $(x_s, y_s)$ of an input image on the input memory; an image magnification $\alpha$ in the main scanning direction; an image magnification $\beta$ in the sub scanning direction; an angle of rotation $\phi$; coordinate $(x_c, y_c)$ of the center of rotation; an amount of displacement $x_m$ in the main scanning direction; an amount of displacement $y_m$ in the sub-scanning direction; and an address $(x_D, y_D)$ in the output memory, there exist the following relationship:

$$\begin{pmatrix} x_D \\ y_D \end{pmatrix} = \begin{pmatrix} \alpha & 0 \\ 0 & \beta \end{pmatrix} \begin{pmatrix} \cos\phi & -\sin\phi \\ \sin\phi & \cos\phi \end{pmatrix} \begin{pmatrix} x_s - x_c \\ y_s - y_c \end{pmatrix} + \begin{pmatrix} x_c \\ y_c \end{pmatrix} + \begin{pmatrix} x_m \\ y_m \end{pmatrix} \quad (1)$$

so that $$x_d = \alpha\cos\phi \cdot \boxed{x_s} - \alpha\sin\phi \cdot \boxed{y_s} + \boxed{(1 - \alpha\cos\phi) \cdot x_c + \alpha\sin\phi \cdot y_c + x_m} \quad (2)$$

$$y_d = \beta\sin\phi \cdot \boxed{x_s} - \beta\cos\phi \cdot \boxed{y_s} + \boxed{\beta\sin\phi \cdot x_c + (1 - \beta\cos\phi) \cdot y_c + x_m} \quad (3)$$

```
                                                    | parallel displacement
                                                    | address of center of conversion (sub.-scan. direction)
                                          | initial offset
                                          | address of center of conversion (main scan. direction)
                        | source address (sub-scan)
                  | increase in synchronization for sub scanning
           | source address (main scan.)
      | increase in synchronization for main scanning
destination address
```

Figure 3:
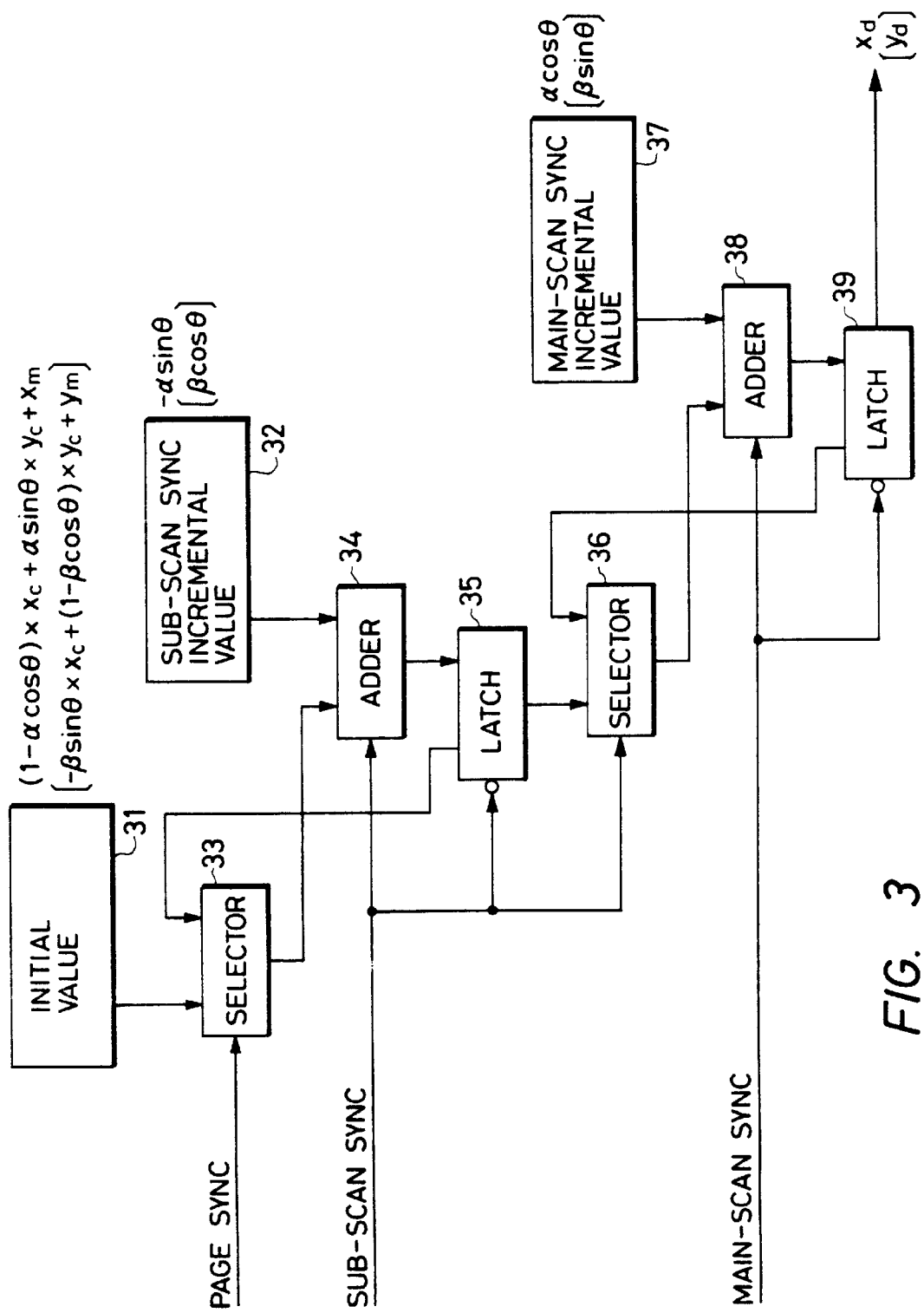
FIG. 3 is a block diagram of an address generator of an affine converter.
Figure 4:
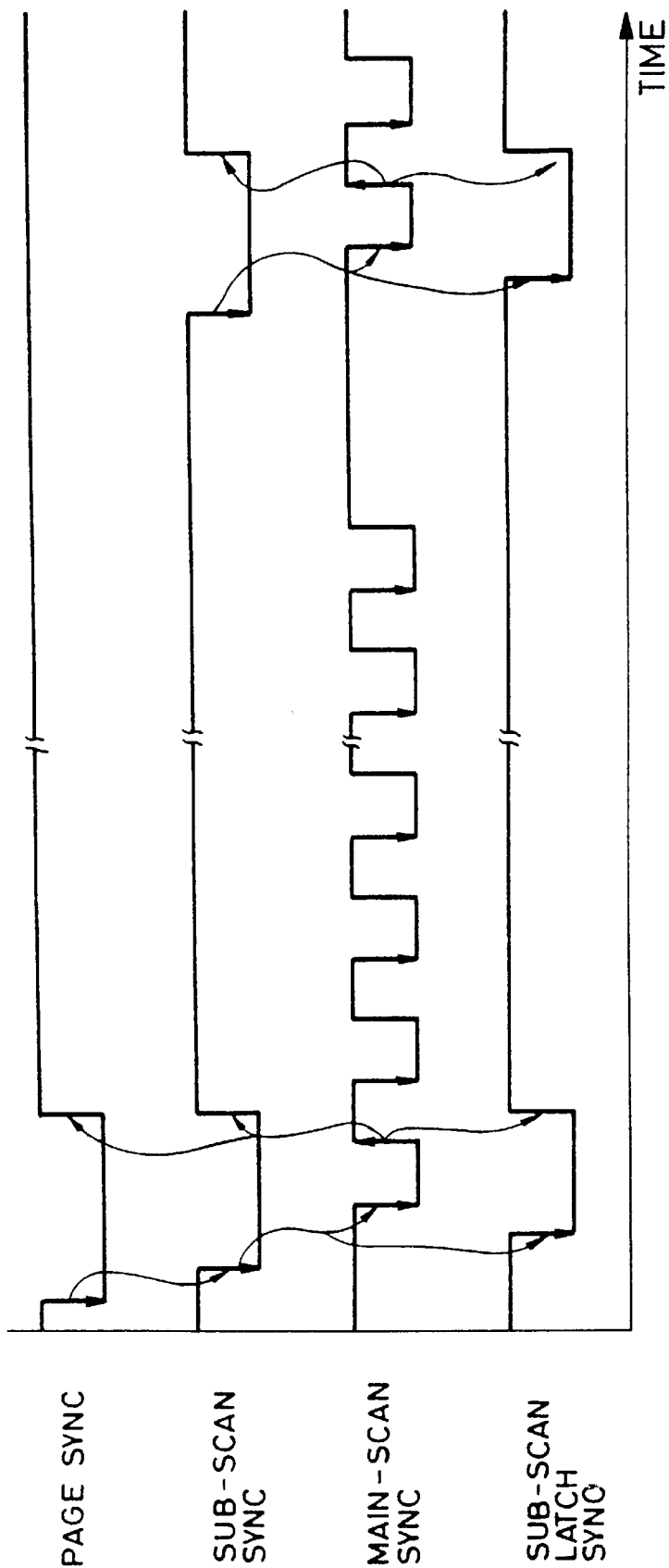
FIG. 4 is a timing chart of the address generator.

If $x_s$ and $y_s$ are given, $x_D$ and $y_D$ can be determined from these equations (2) and (3), and this can be achieved for example with a circuit shown in FIG. 3, to which reference is made in the following. In case of determining $x_D$ according to (2), the value of initial offset is set, as an initial parameter, in a register 31. Also the increments in the synchronization in the sub-scanning and main scanning directions are respectively set in corresponding registers 32, 37. Setting of these parameters is conducted by the CPU according to the image magnification and the angle of rotation. FIG. 4 is a timing chart showing the relation of a page synchronization signal, a sub-scanning synchronization signal and a main scanning synchronization signal. In response to the downshift of the page synchronization signal, the sub-scanning synchronization signals are generated by a number of scanning lines present in a page. Also in response to each downshift of the sub-scanning synchronization signal, main scanning synchronization signals are generated by the number of data present in a scanning line. These synchronization sinals are generated by unrepresented generator circuits. During the low-level state of the page synchronization signal, a selector 33 releases a value latched by the initial value register 31. An adder 34 executes an adding operation in response to the downshift of the sub-scanning synchronization signal. The output of the adder 34 is latched in a latch 35, in response to the sub scanning synchronization signal. Also a selector 36 releases the output of the latch 35 during the low-level state of the sub-scanning synchronization signal. An adder 38 adds the output of the selector 36 and the increment in the synchronization of main scanning, in response to the downshift of the main scanning synchronization signal, and the output thereof is latched in a latch 39 in response to the upshift of the main scanning synchronization signal. The latch 35 holds an output address corresponding to a leading data of the scanning line, while the latch 39 provides output addresses corresponding to the various data in the scanning line. The $y_D$ can be obtained in a similar manner according to the equation (3).

The addresses thus determined are generally irrational numbers since $\cos\phi$, $\sin$, etc. are irrational, but such irrational numbers are represented by fractional number of a sufficient number of bits. Integers close to such fractional numbers are selected as output addresses. An inverse conversion is conducted for each integral address present in an area defined around a center $(x_D, y_D)$, with a width $\alpha(|\sin\phi|+|\cos\phi|)$ in the main scanning direction and a width $\beta(|\sin\phi|+|\cos\phi|)$ in the sub-scanning direction. Between said integral address $(X_D, Y_D)$ and a corresponding input address $(X_s, Y_s)$ there exists the following relation:

$$\begin{pmatrix} x_s \\ y_s \end{pmatrix} = \begin{pmatrix} \cos\phi & \sin\phi \\ -\sin\phi & \cos\phi \end{pmatrix} \begin{pmatrix} 1/\alpha & 0 \\ 0 & 1/\beta \end{pmatrix} \begin{pmatrix} x_D - x_m - x_c \\ y_D - y_m - y_c \end{pmatrix} + \begin{pmatrix} x_c \\ y_c \end{pmatrix} \quad (4)$$

$$X_s = \frac{1}{\alpha} \cos\phi \cdot \boxed{X_D} + \frac{1}{\beta} \sin\phi \cdot \boxed{y_D} + \boxed{(1 - \frac{1}{\alpha} \cos\phi) \cdot X_c - \frac{1}{\beta} \sin\phi \cdot Y_c - \frac{1}{\alpha} \cos\phi \cdot x_m - \frac{1}{\beta} \sin\phi \cdot y_m} \quad (5)$$

$$Y_s = \frac{1}{\alpha}\sin\phi \cdot \left(y_D\right) + \frac{1}{\beta}\cos\phi \cdot \boxed{Y_D} + \left(\frac{1}{\alpha}\sin\phi \cdot X_c + \left(1 - \frac{1}{\beta}\cos\phi\right) \cdot Y_c + \frac{1}{\alpha}\sin\phi \cdot x_m - \frac{1}{\beta}\cos\phi \cdot y_m\right). \quad (6)$$

Figure 5:
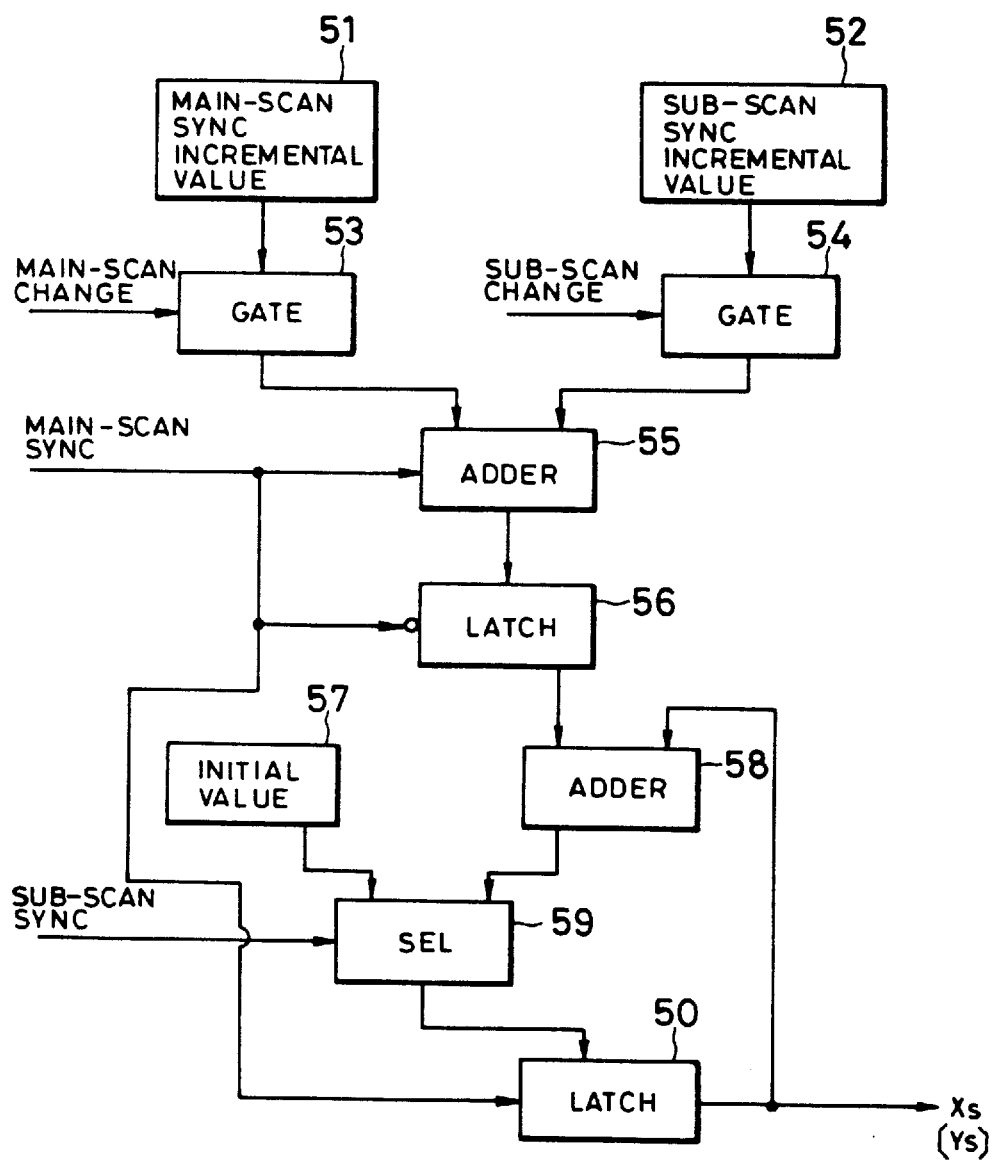
FIG. 5 is a block diagram of the address generator.
Figure 6:
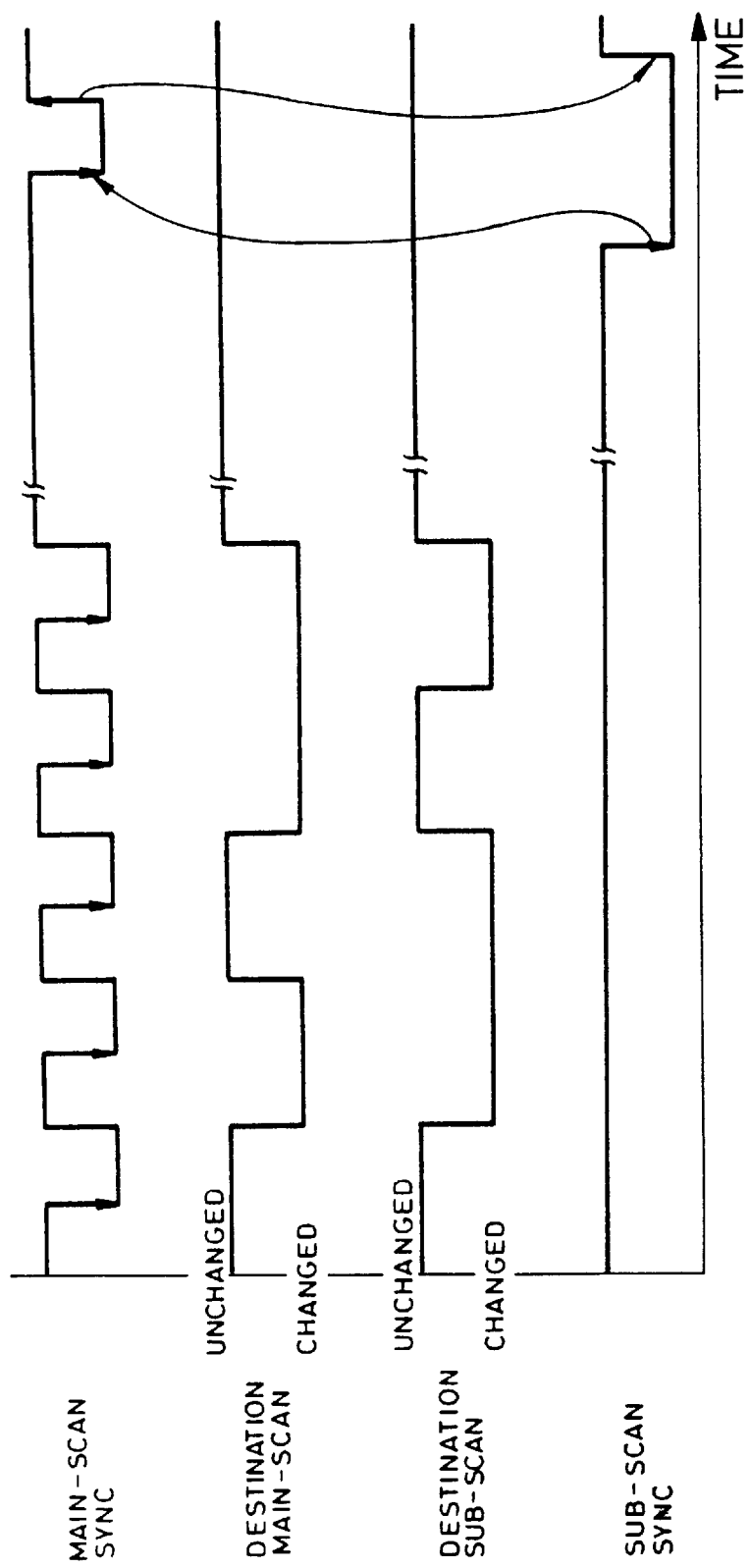
FIG. 6 is a timing chart of the address generator.

With labels (from innermost/right to outermost/left):
- parallel displacement in main scan direction
- parallel displacement in main scan direction
- address of center of conversion (sub-scan direction)
- initial offset
- address of center of conversion (main scan direction)
- destination address conversion (sub-scan direction)
- increment in synchronization in sub-scan direction
- destination address conversion (main scan direction)
- increment in synchronization in sub-scan direction
- source address Calculations according to these equations are conducted by a circuit shown in FIG. 5, of which a timing chart is shown in FIG. 6. The initial offset and the increments of synchronization in the main scanning and sub-scanning directions are set in advance by the CPU in registers 57, 51 and 52. In case of a variation in $X_D$ and $Y_D$, a gate signal for controlling gates 53, 54 is shifted to a low-level state by an unrepresented circuit, composed for example of a register for holding the value corresponding to a preceding clock pulse and a comparator for comparing said value with the value of a present clock pulse. In such state said gates respectively release the values of the registers 51, 52 and otherwise release a low level. In response to the downshift of the main scanning synchronization signal, an adder 55 executes an adding operation, and the output thereof is latched in a latch 56 in response to the upshift of the main scanning synchronization signal. During the low-level state of the sub-scanning and scanning synchronization signal, a selector 59 releases a value held in a register 57, or, otherwise, a value held in a register 58. A latch 59 latch 50 latches the output of the selector 59 in response to the upshift of the main scanning synchronization signal. An adder 58 adds the values of the latches 50 and 56 in response to the downshift of the main scanning synchronization signal.

Figure 7:
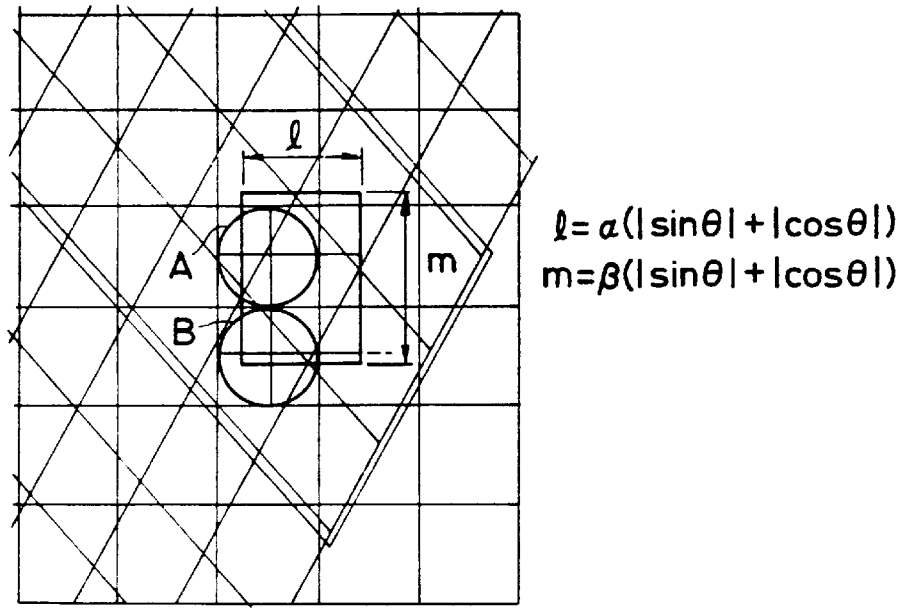
FIGS. 7 and 8 are charts showing the correlation of addresses between an original image and a processed image.
Figure 8:
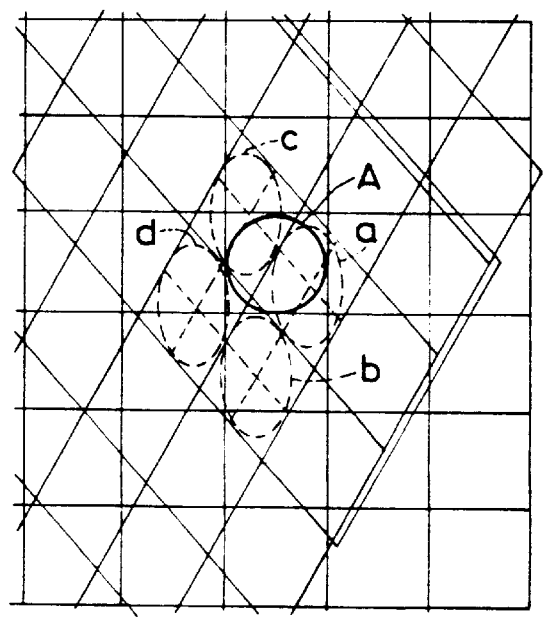
Figure 9:
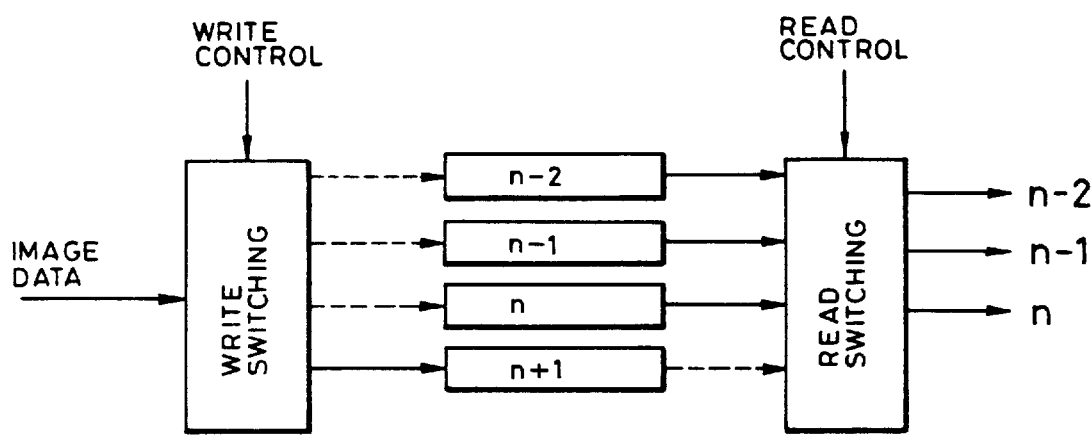
FIG. 9 is a block diagram of a line buffer for affine conversion.

$X_x$ and $Y_s$ thus obtained are generally irrational numbers, like $x_D$ and $y_D$, and are in practice represented by fractional numbers, which are rounded to obtain input addresses to be released. FIGS. 7 and 8 show correlation between source addresses and destination addresses. A square lattice indicates an address lattice of the destination side, wherein the center of each square corresponds to an integral address. On the other hand, a parallelogram (or more precisely, rhomboidal) lattice indicates an address lattice of the source side, wherein the center of each parallelogram (rhomboid) corresponding to an integral address. In FIG. 7, a rectangle defined by l and m indicates the aforementioned area around the center $(x_D, y_D)$, wherein A and B are destination addresses to be released. As shown in FIG. 8, a is determined as the output A. The circuit shown in FIG. 5 is provided in plural units, corresponding to the maximum number of output lattices possibly present in the area l×m, and such circuits function in parallel manner. Also at the input side there are provided four scanning line buffers as shown in FIG. 9, and, during data input into one of said four buffers, the remaining three buffers are utilized for the above-mentioned processing with data already entered into said buffers. The input scan data consist of the aforementioned encoded data, and the input addresses are determined in the order of input. In this manner the input and output addresses are correlated to achieve the affine conversion.

In the following there will be explained a color conversion process.

Figure 10:
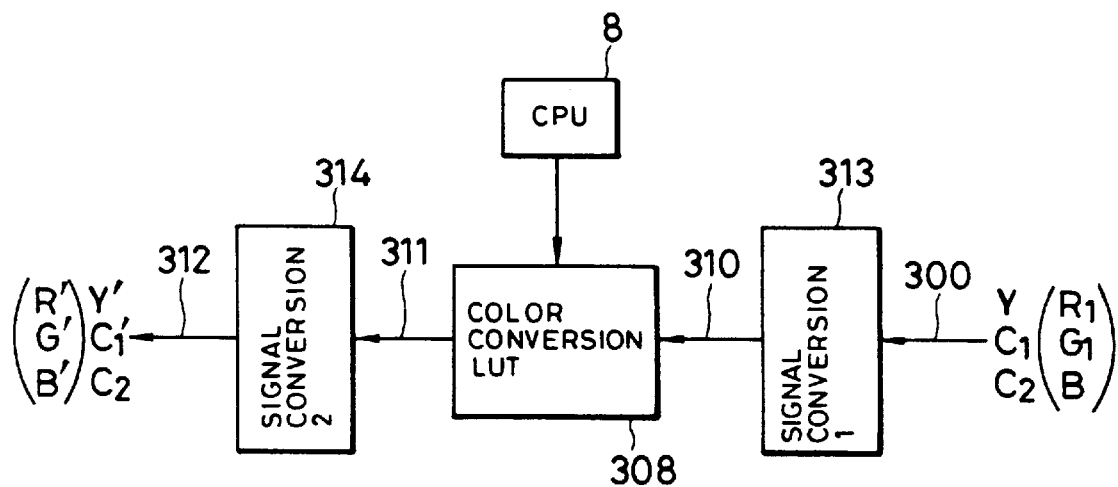
FIGS. 10, 11 and 12 are block diagrams of color conversion circuits.

The color conversion processor 302 is so designed as to be capable of extracting or converting a particular color. Stated differently, it is capable not only of arithmetic operations on each color component R, G and B (or Y, I and Q), but also of look-up table operations for each color component or three combined color components. An example of such operation is shown in FIG. 10. Input color signals 300 of components Y, C1 and C2 (or R, G and B) are converted, by a signal converter 313, into a signal 310 adapted to a color conversion look-up table. Said signal, containing three combined color components, is utilized for reducing the capacity required for the look-up table and for easy understanding of the input and output of the look-up table, for example represented in Munsel's system. This signal is however not utilized throughout the entire system, in order to use common interfaces and process with other units of the color image processing. The signal 310 is converted into a signal 311 by a color conversion look-up table 308 designated by the CPU 8. Said signals 311 and 310 belong to the same color representing system, so that said look-up table is not for the conversion of the color representing system but of an arbitrary color to another color. Said signal 311 is converted by a signal converter 314 to a signal 312 of separated components. Said signal 312 also belongs to the same color representing as that of the signal 300. Thus the signal converters 313 and 314 execute mutually inverse conversions, except for the quantizing errors. The foregoing procedure is adopted for achieving an intuitively acceptable conversion with a reduced capacity of the look-up table in a color conversion of component combination type, so that even if the signal may be deteriorated, the image can nonetheless be visually acceptable. The capacity of a color conversion look-up table of three-component combination amounts to 48 Mbyte if the input and output of the color components of red, green and blue are conducted with 8 bits, but the signal converters 313, 314 only require a capacity of about half even when composed of look-up table, and may also be composed of logic circuits since only fixed conversions are involved.

Figure 11:
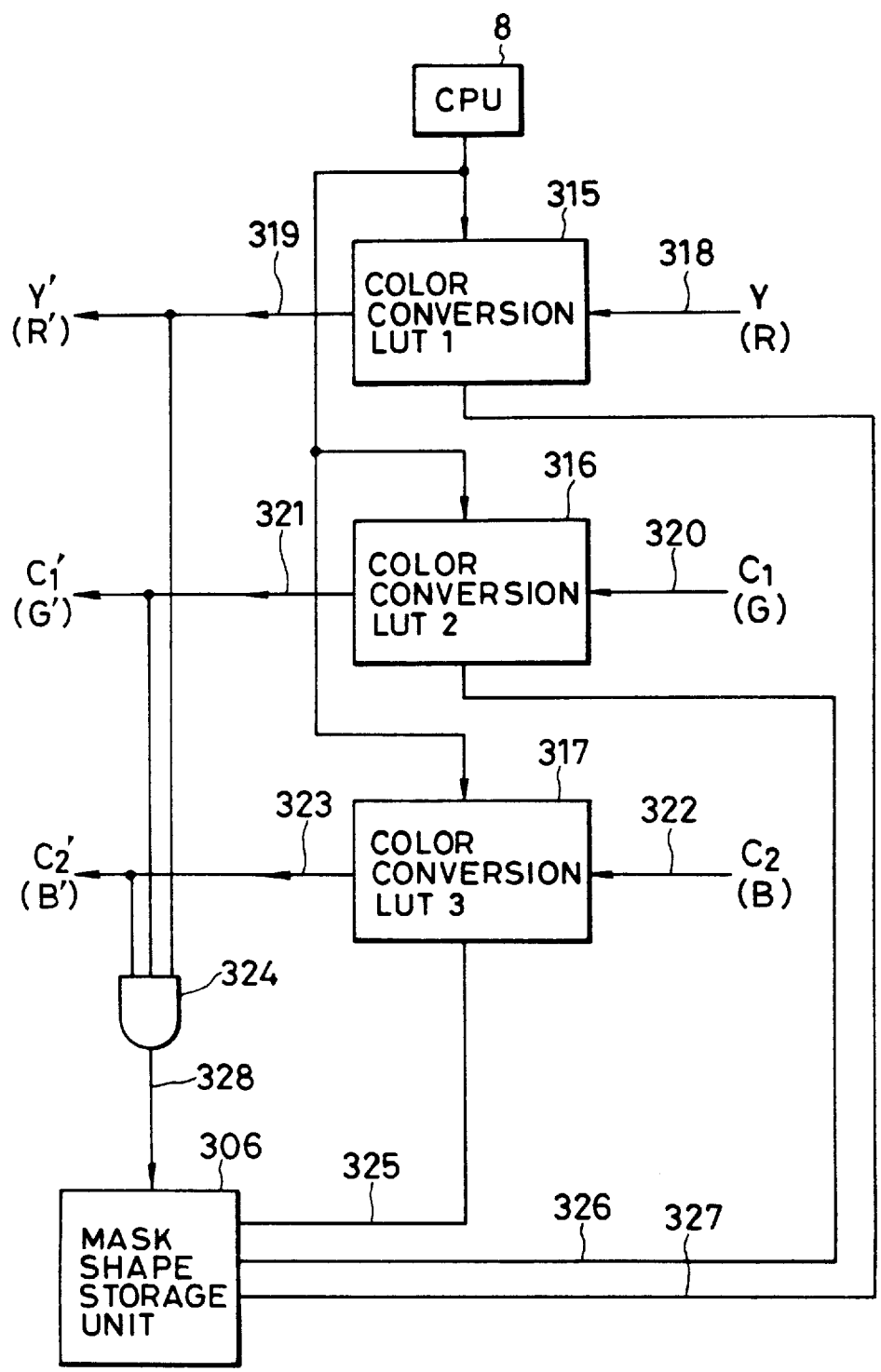
Figure 12:
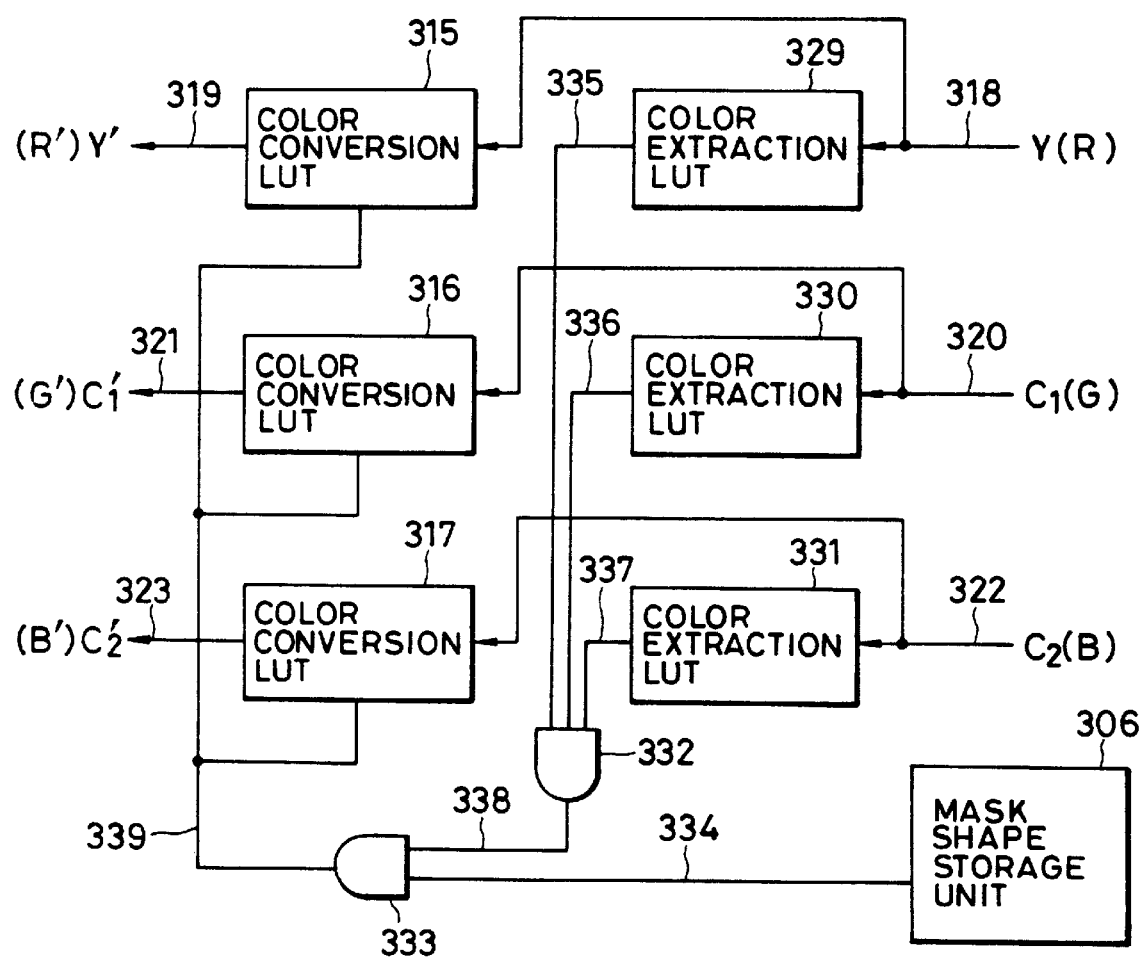

Now reference is made to FIG. 11 for explaining a second embodiment of the color conversion wherein the color conversion look-up table is separated for each color component. In such structure the extraction and conversion of a particular color are conducted in the following manner. The color conversion is achieved in two steps. The first step extracts pixels to be subjected to color conversion. Color conversion look-up table 315, 316, 317 release binary outputs 319, 321, 323 which are supplied to a logic circuit 324. The output 328 thereof is stored in a mask shape memory 306, whereby the positional information of the pixels to be subjected to color conversion is memorized. In the second step, the CPU 8 re-selects or rewrites the color conversion look-up tables 315, 316, 317 to define conversion look-up tables. In synchronization with signals 318, 320, 322, color conversion enable signals 327, 326, 325 are read from the mask shape memory 306, and the output of the look-up tables or the input signals are released as output signals respectively when said signals 327, 326, 325 are on or off. This embodiment allows conversion of a particular color of the image through the addition of a mask shape memory, without the use of a large look-up table. In a third embodiment shown in FIG. 12, there are provided two look-up tables for color extraction and color change for each color. Color extraction look-up tables 329, 330, 331 are so constructed as to provide true signals 335, 336, 337 when signals 318, 320, 322 represent a particular color to be converted. Said signals 335, 336, 337 are processed by a logic circuit 332, and then processed by a logic circuit 333 together with an output signal 334 of a mask shape memory 306 to obtain a signal 339, which is supplied to color-conversion look-up tables 315, 316, 317 to determine whether the output signals of the look-up tables 315, 316, 317 or the input signals 318, 320, 322 are released as the output signals. In this embodiment, the mask shape memory needs only to designate the area of color conversion once, and the color conversions is conducted on real-time basis. The look-up tables 315, 316, 317, 329, 330 and 331 can be rewritten by the unrepresented CPU 8. In the foregoing embodiments, it is possible to achieve a desired color conversion through plural processings by rewriting or re-designating the look-up tables. Also in the second and third embodiments, the look-up tables may be designed to release output signals three or more levels, instead of two levels or true and false, thereby achieving a more complex color conversion at a time.

In the following there will be explained a mask synthesis process.

Figure 14:
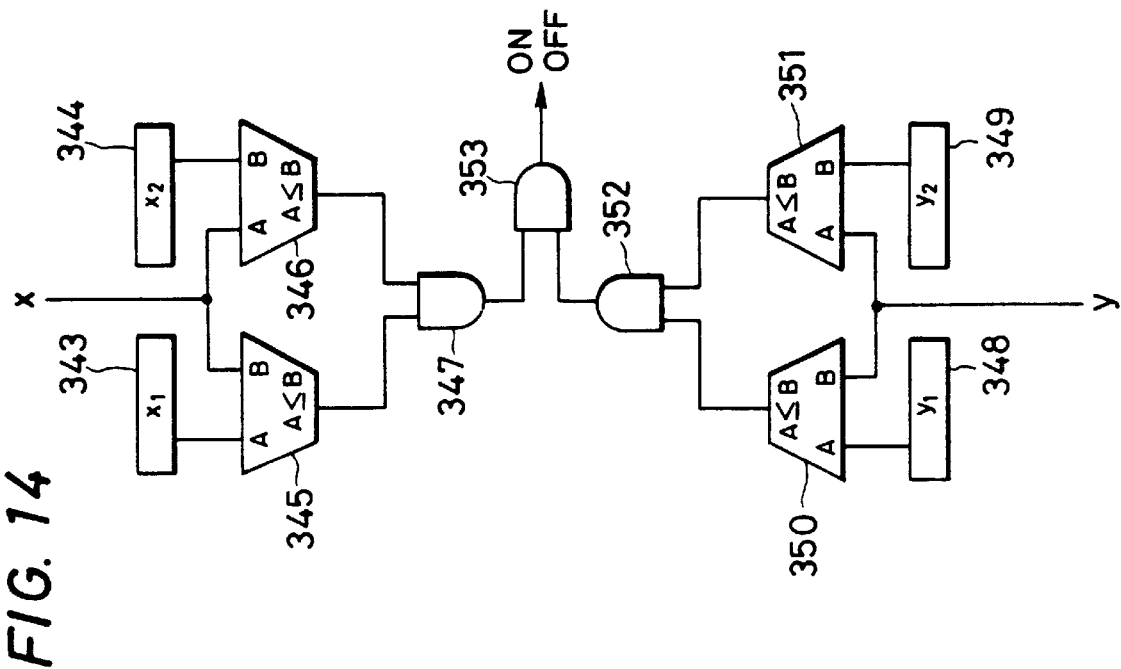
FIG. 14 is a block diagram of a circuit for generating a simple-shaped mask.
Figure 13:
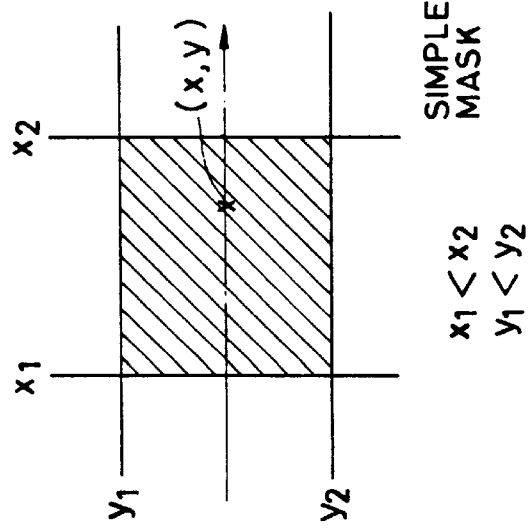
FIG. 13 is a view of a simple-shaped mask.
Figure 15:
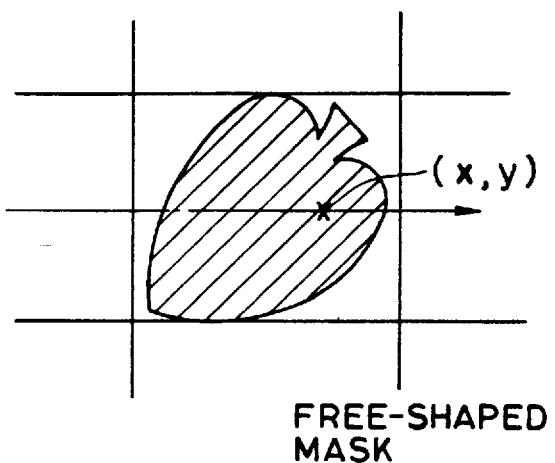
FIG. 15 is a view of a free-shaped mask.
Figure 16:
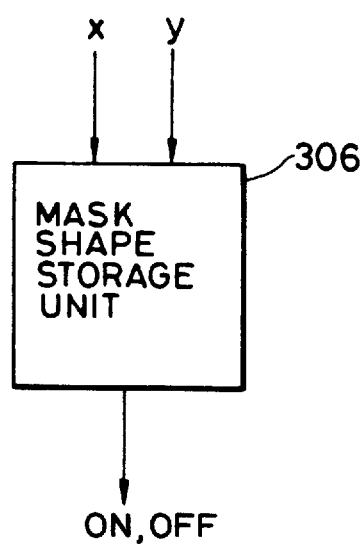
FIGS. 16, 17 and 18 are views illustrating a mask shape memory.
Figure 17:
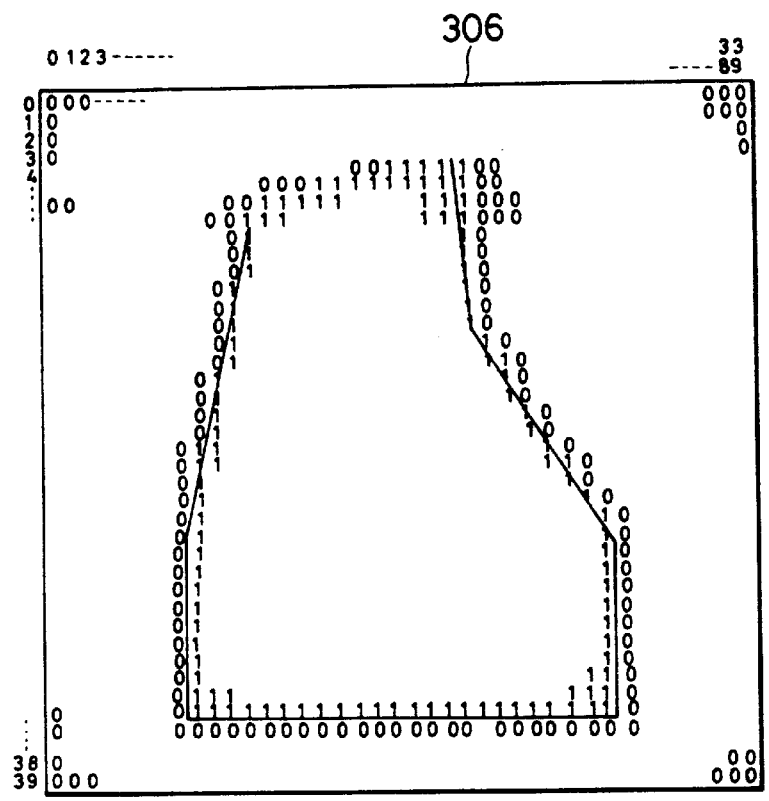
Figure 18:
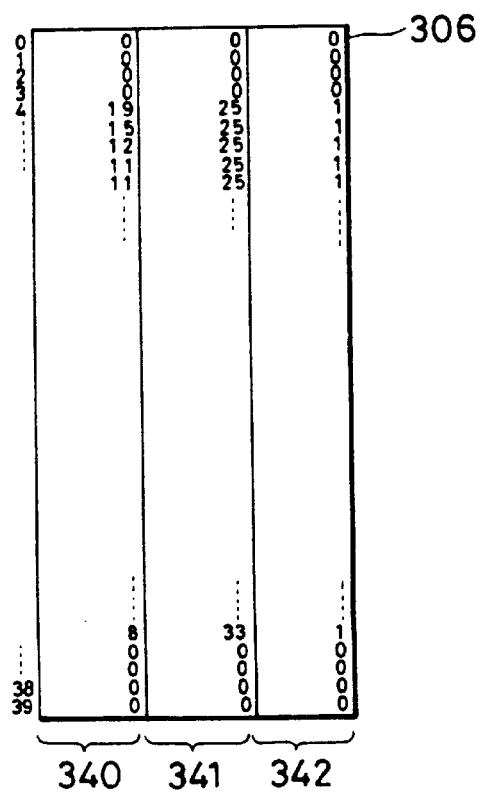

The mask synthesis processor 303 is designed to superpose an image on another background image, according to a signal from the mask shape memory 306, or a signal designated by a mask shape designation unit provided with an unrepresented shape generator. The image editing processes mentioned above include superposition of an image of a simple shape such as rectangular shape on a background image, and superposition of an image or an arbitrary shape on a background image. FIGS. 13 and 15 show examples of such mask shape. FIG. 14 is an embodiment of the mask shape designation unit 309, that can extract an image of the shape shown in FIG. 13 for superposition. Also FIG. 16 shows another embodiment of said designation unit 309, which effects data reading from the mask shape memory 306. Address (x, y) may be increased corresponding to the address of the image memory 5, or may be synchronized with the image signal from the decoder 6. The mask shape may be stored by a bit map memory as shown in FIG. 17, wherein a memory unit is allotted to a pixel of the image, or a block of n×n pixels thereof, or by the pixel address of start and end points of the mask shape in each raster. Also, information is added to enable transparent synthesis in which the background image and the image superposed thereon are both visible. For example, in FIG. 18, there are provided a memory 304 for storing start addresses, a memory 341 for storing end addresses, and a memory 342 for storing synthesized information. Such transparent synthesis achieved for example by not storing the synthesized information at an odd address, if said synthesized information is [2], even when the image address is included in the range of the start address.

Figure 19:
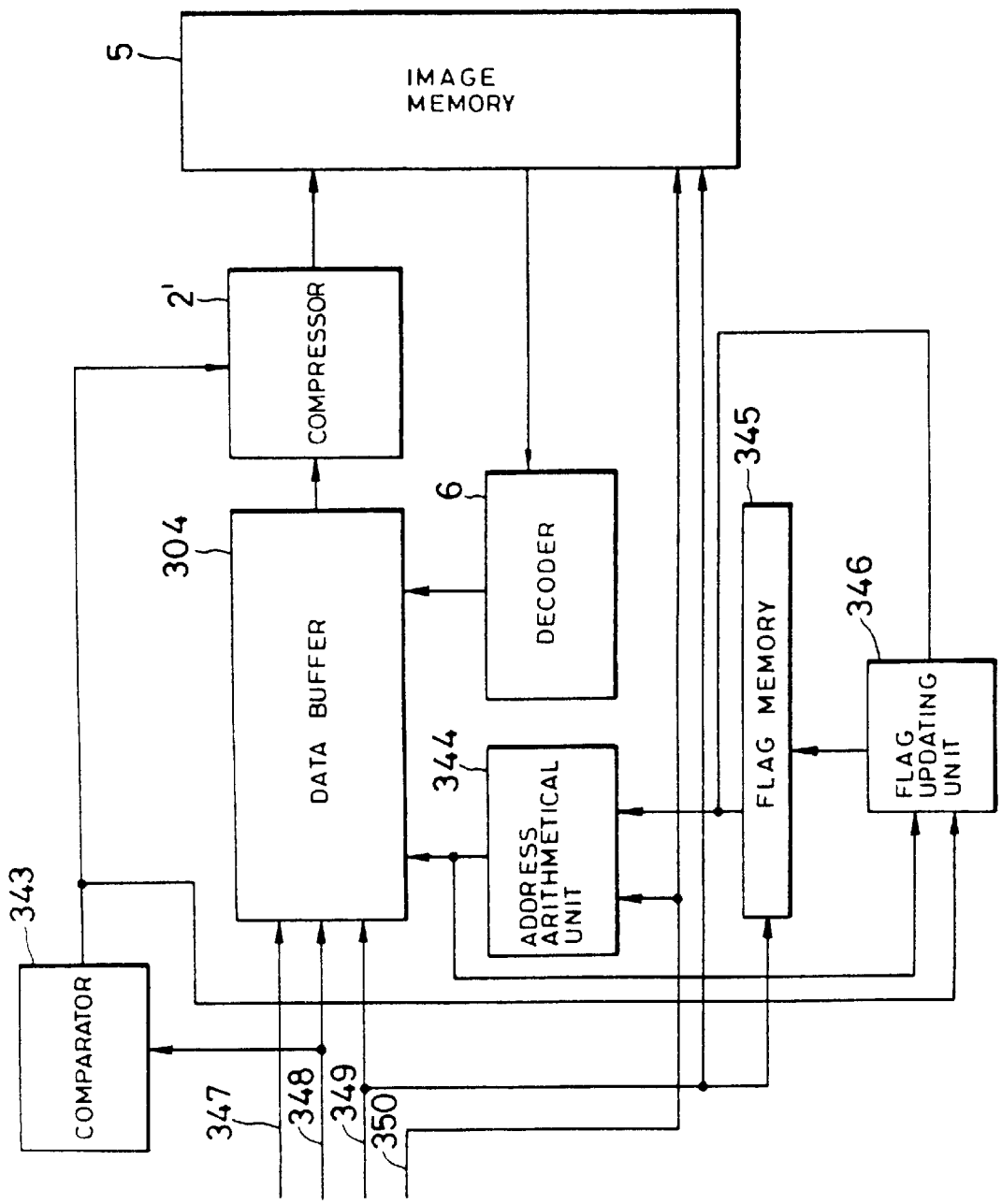
FIG. 19 is a block diagram of a re-encoder.

In the following there will be explained a synthesized data buffer, which, prior to the signal recording in compressed and encoded state in the memory 5, temporarily stores pixel data until all the data necessary for compression are made avilable, and transfers data to the compressor when said data become available. FIG. 19 is an embodiment of the synthesized data buffer, provided with a synthesized data buffer memory 304; a memory address arithmetic unit; a flag memory 345; and a flag updating unit 346. This buffer system is constructed based on a fact shown in FIG. 20, which enumerates the sequence of raster processes employed in the present embodiment, in a unit encoding block. Eight patterns in FIG. 20 indicate that the point at the lower right corner is always processed last. Consequently the timing of compression encoding can be identified by the processing of said point at the lower right corner in the unit encoding block. In FIG. 19, a comparator 343 is provided for identifying that said point at the lower light corner has been processed. The comparator 343 extracts the address of said point from an address signal 348 indicating the position in the block, and transmits the timing of compression to the compressor 2'. After the compression, the data of the corresponding block are no longer necessary. Thus the content of the flag memory 345 is renewed by the flag updating unit 346, and the data memory 304 can thus stored the data of a succeeding block. This procedure is illustrated in FIGS. 21A and 21B. FIG. 21A shows the mode of storage of an image with rasters inclined by 30° into the encoding memory 5, illustrates a state after the storage of a first raster. In this state a block of the 0-th row and (n−1)-th column is transferred to the compressor 2' for compression, and a block of the 0-th row and (n+1)-th column is likewise encoded. FIG. 21B illustrates a state immediately after the storage of a third raster, and, in this state, a block of the 1st row and n-th column is transferred to and encoded in the compressor 2'. At this point the n-th row of the flag memory is updated. This procedure is repeated to complete the processing of an entire image.

Figure 22:
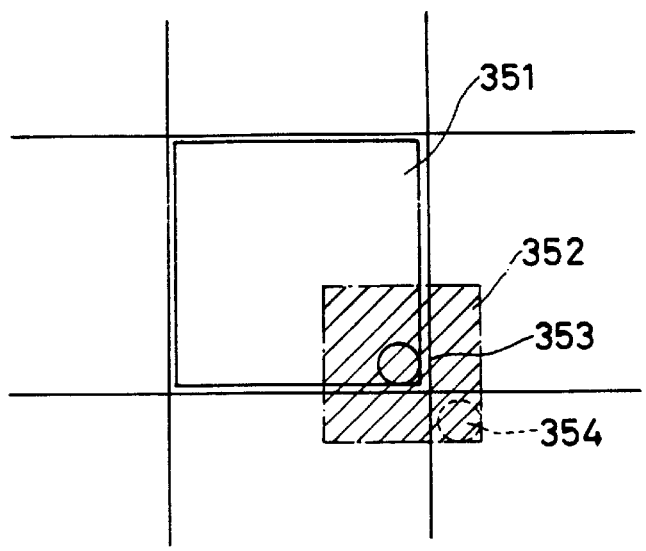
FIG. 22 is a view showing the positional relation between a spatial filter kernel and an encoding block.
Figure 23:
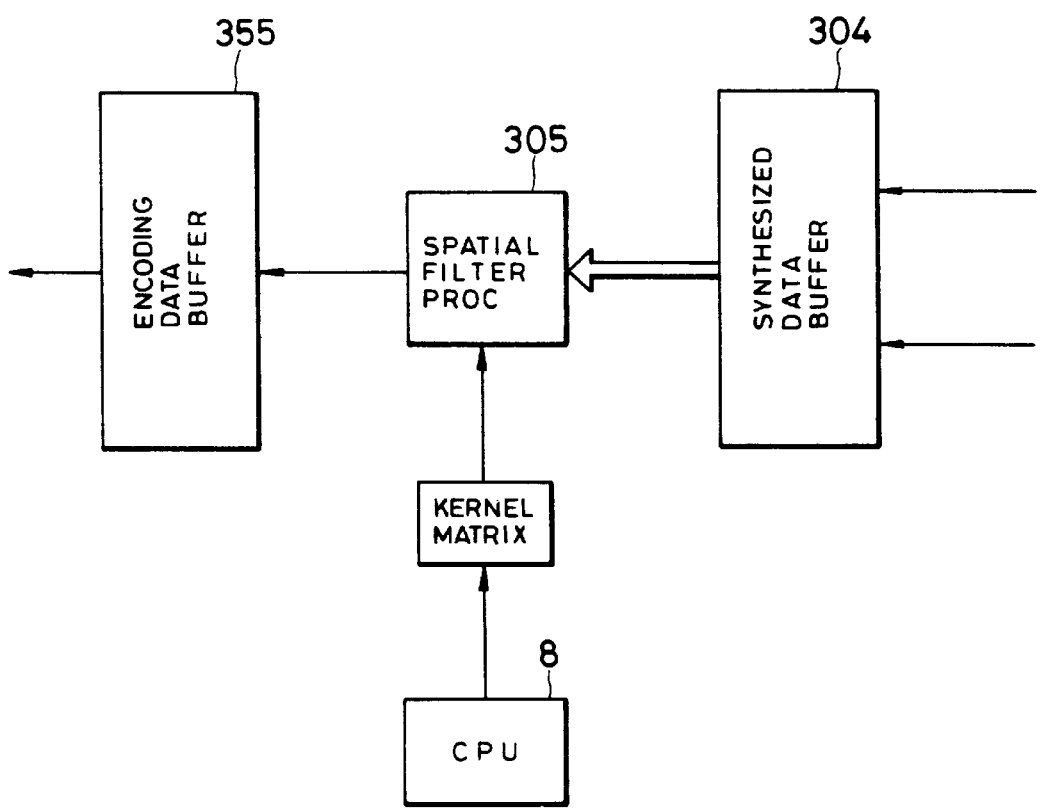
FIG. 23 is a block diagram of a spatial filter.

FIG. 22 shows the relation between an encoding block and a spatial filter kernel when a spatial filter processor 305 is added behind the synthesized data buffer. In FIG. 22 there are shown an encoding block 351; a spatial filter kernel 352; a pixel position 353 for determining the start timing of encoding; and a pixel position 354 for determining the timing necessary for recording 353 in the encoding data buffer. Presence of data buffers in front of and behind the spatial filter processor allows to avoid complicated processing, as shown in FIG. 23, wherein illustrated a synthesized data buffer 304 for processing for each line instead of each block; and an encoding data buffer 355 which has a flag for each block as explained before.

The desired performances are achieved by the above-explained structure of the raster processor.

In the following there will be explained the compression process employed in the present embodiment, which utilizes vector quantization based on block encoding. Each block is composed of 4×4 pixels, and the signal to be processed consists of a luminance signal Y and color difference signals C1, C2. The original signal, for example image data obtained by the reader 1 and composed of red, green and blue digital signals of 8 bits per pixel each, is converted in the converter 11 into a luminance signal Y and color difference signals I, Q of NTSC format. Said conversion can be achieved according to following matrix calculation of the red, green and blue signls:

| Y |   | 0.3 | 0.59 | 0.11 | R |
|---|---|---|---|---|---|
| I | = | 0.6 | −0.28 | −0.32 | G |
| Q |   | 0.21 | −0.52 | 0.31 | B | in which the coefficients of the conversion matrix are suitably adjusted according to the color separation characteristics, gamma characteristics, ect., of the reader.

Though the present embodiment employs independent compression of said signals Y, C1 and C2, a combined compression is also possible. The compression for the luminance signal Y is achieved by normalizing the average value and the dispersion of 8-bit signals of the 4×4 pixels, and that for the signals C1, C2 is achieved by reducing the codes, other than the average value, to about ⅓.

In the following there will be explained the cathode ray tube controller 9.

Figure 24:
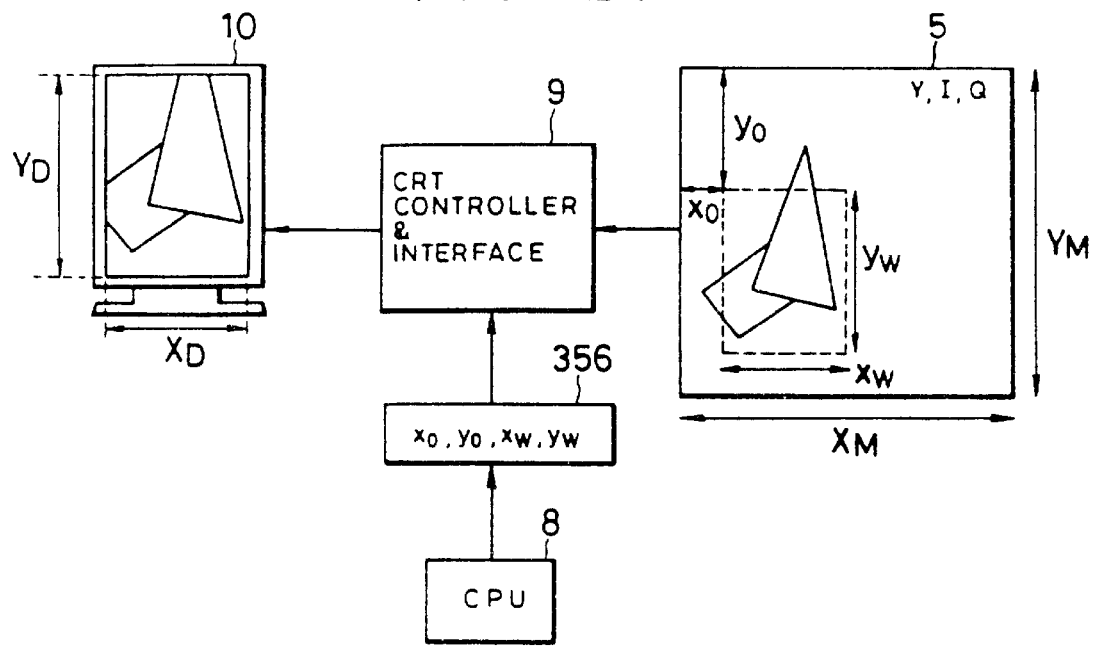
FIGS. 24, 26 and 28 are schematic views of a cathode ray tube controller.
Figure 25:
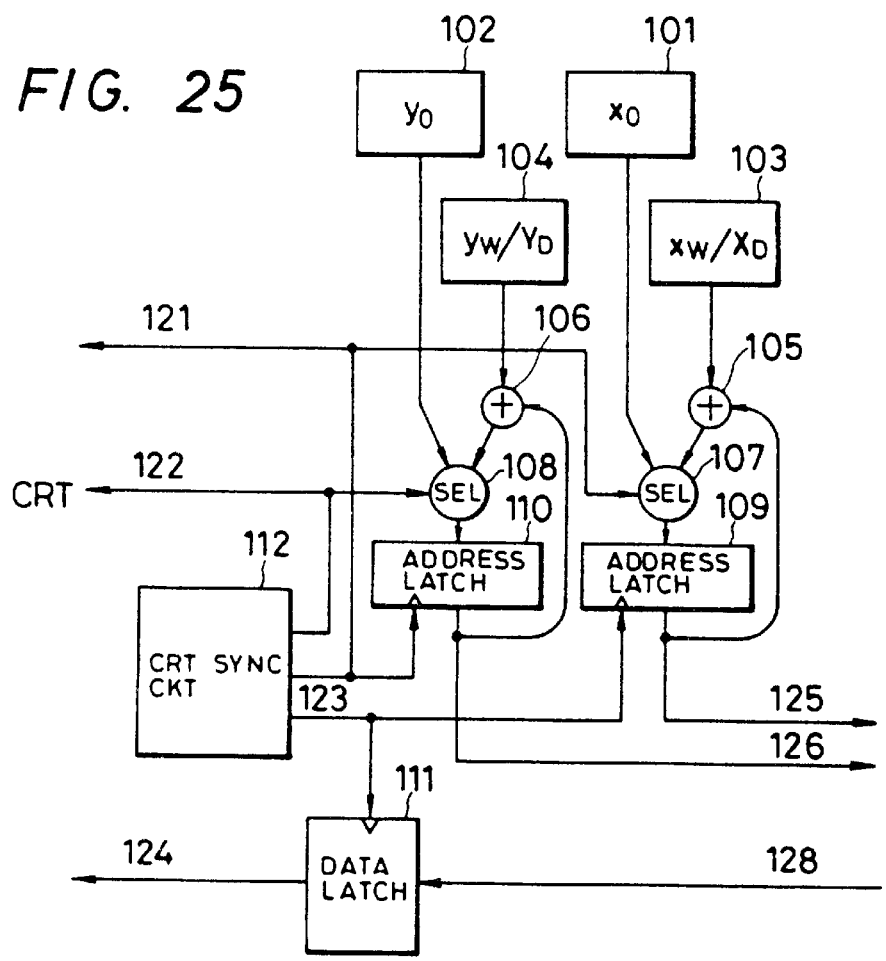
FIGS. 25, 27 and 29 are block diagrams of a cathode ray tube controller.

FIG. 24 illustrates the function of the cathode ray tube controller 9, and there are shown a compression memory 5; the cathode ray tube (CRT) controller 9; a color cathode ray tube 10; a CPU 8; and a parameter register 356 set by the CPU. The present embodiment employs a two-dimensional address (X, Y0), but that address may be converted into a one-dimensional address. The CRT controller shown in FIG. 24 is capable of displaying a rectangular area of an arbitrary size ($x_w$, $y_w$) having an arbitrary start address ($x_0$, $y_0$) in the memory 5, on a cathode ray tube of a resolving power of $Y_D$ dots in the vertical direction and $X_D$ dots in the horizontal direction. Said arbitrary values $x_0$, $y_0$, $x_w$, $y_w$ may have certain limitations of the ranges thereof and that they have to be multiples of 2 or 4, for example. FIG. 25 shows an embodiment of said CRT controller, wherein are shown are parameter registers 101, 102, 103, 104; adders 105, 106; selectors 107, 108; address latches or registers 109, 110; a CRT synchronization circuit 112; a horizontal synchronization signal 121; a vertical synchronization signal 122; a pixel clock signal 123; a data latch 111; a color signal 128 read from a memory; a color signal 124 to the CRT; a horizontal address (X) 125; and a vertical address (Y) 126. The CRT synchronization circuit 112 generates the vertical synchronization signal 122, horizontal synchronization signal 121 and pixel clock signal 123. In response to said signal 121, the Y-address latch 110 fetches an initial address $y_0$ since the selector 108 selects said initial value $y_0$ during the on-state of the signal 122. Also in response to the signal 123, the X-address latch 109 fetches an initial address $x_0$ since the selector 107 selects said initial value $x_0$ during the on-state of the signal 121. In other situation the value of the X-address latch 109 increases by $x_w/X_D$ per every clock (or every dot) to renew the memory address thereby achieving a scanning operation in the x-direction. When the horizontal synchronization signal 121 and the pixel clock signal are both turned on, the X-address latch 109 is reset to $x_0$. Also the value of the Y-address latch 110 increases by $y_w/Y_D$ per every horizontal synchronization signal to renew the memory address, thereby achieving a scanning operation in the Y-direction.

Figure 26:
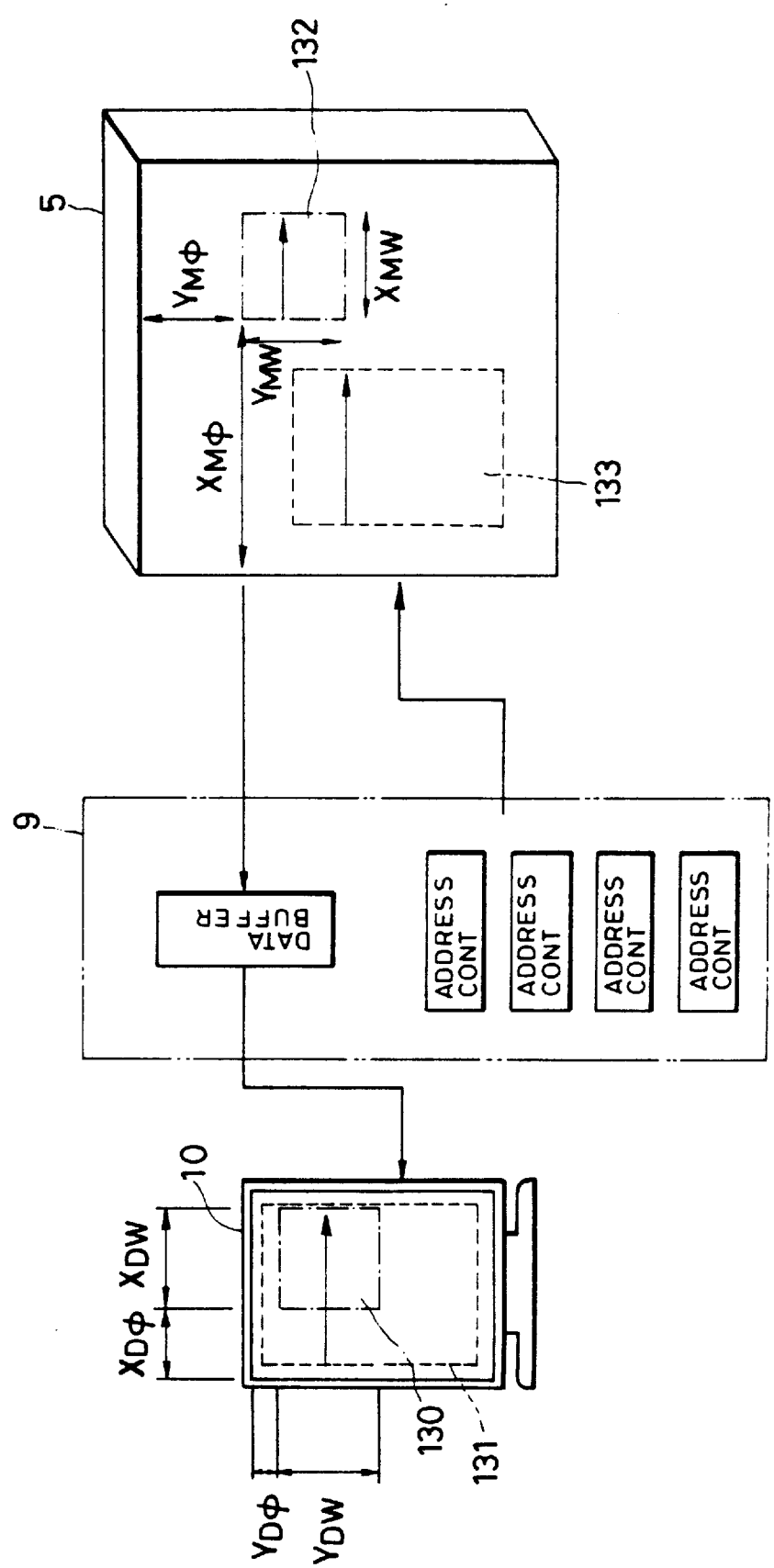
Figure 27:
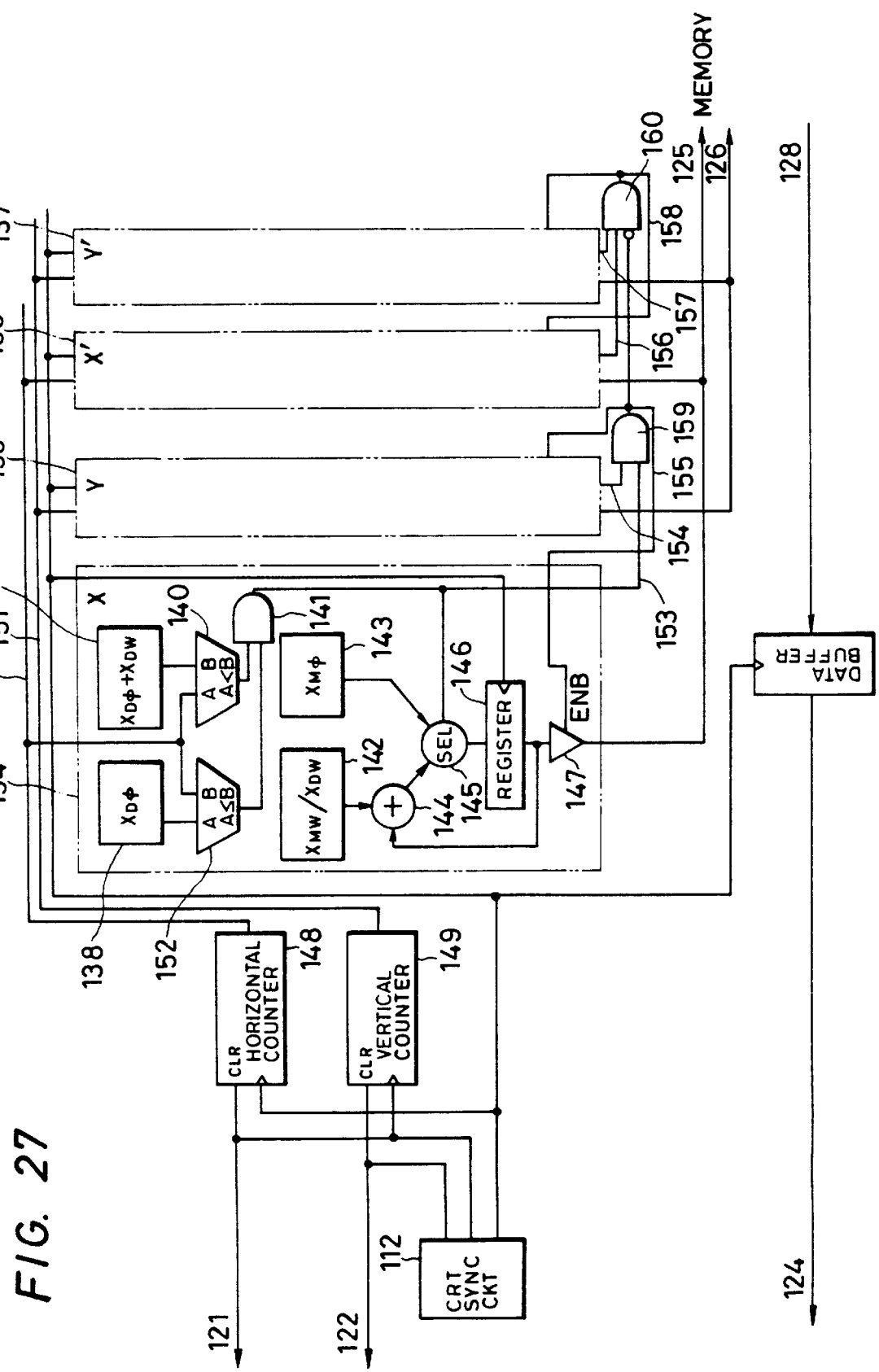

FIG. 26 shows the function of a CRT controller capable of synthesizing rectangles on the CRT. Rectangular images 130, 131 displayed on the CRT 10 are stored as areas 132, 133 in the memory 5. In the illustrated state, the image 130 is superposed on the image 131, of which an overlapping portion is not displayed. Such function can be expanding the circuit of FIG. 25 in a manner as shown in FIG. 27, wherein are provided in-area address generating modules 134, 135, 136, 137 of an identical structure: a horizontal address generating module 134 of a highest priority, a vertical address generating module 135 of a highest priority, a horizontal address generating module 136 of a second priority, and a vertical address generating module 137 of a second priority. There are also provided a horizontal display address counter 148, and a vertical display address counter 149, respectively generating a horizontal display address 150 and a vertical display address 151. Referring to the address generating module 134, there are provided a register 138 for holding a display start address; a register 139 for holding a display end address; and comparators 152, 140 for discriminating, through a logic circuit 141, whether the signal 150 is included in the area defined by the registers 138, 139. If included, said address generating module has the right to release the memory address. Said release of the memory address by said modules 134, 135 is however enabled only when the signals 153, 154 are both true. In such state a logic circuit 159 generates an output enable signal 155, thereby enabling an output buffer 147 to release the content of the address register 146 to a horizontal address bus 125. Similarly the module 135 releases an address to a vertical address bus 126. On the other hand, if either of the signal 153, 154 of the modules 134, 135 becomes false, the logic circuit 159 releases a corresponding signal to disable the output of the modules 134, 135. In this state, if the signals 156, 157 of the modules 136, 137 of the second priority are true, the logic circuit 160 releases a true signal to release the addresses of the modules 136, 137 to the memory address buses 125, 126. If the output of the logic circuit 160 is false, the modules of a third priority are tested, and the right of address output is thus transferred to the modules of lower priorities. Naturally any modules of a highest priority acquiring the right of address output release the address. In the following the address to be released will be explained. Referring to the module 134, there are provided a register 143 for holding a reading start memory address; a register 142 for holding an address increment; a selector 145 for entering the output of the register 143 into an address register 146 while the signal 153 is false; and an adder 144 for adding the content of the increment register 142 to a register 146. When the signal 153 becomes true, the content of the register 146 increses by the content of the register 142 at each clock signal. In this manner the circuit shown in FIG. 27 enables the synthesis of rectangles on the CRT as shown in FIG. 26.

Figure 28:
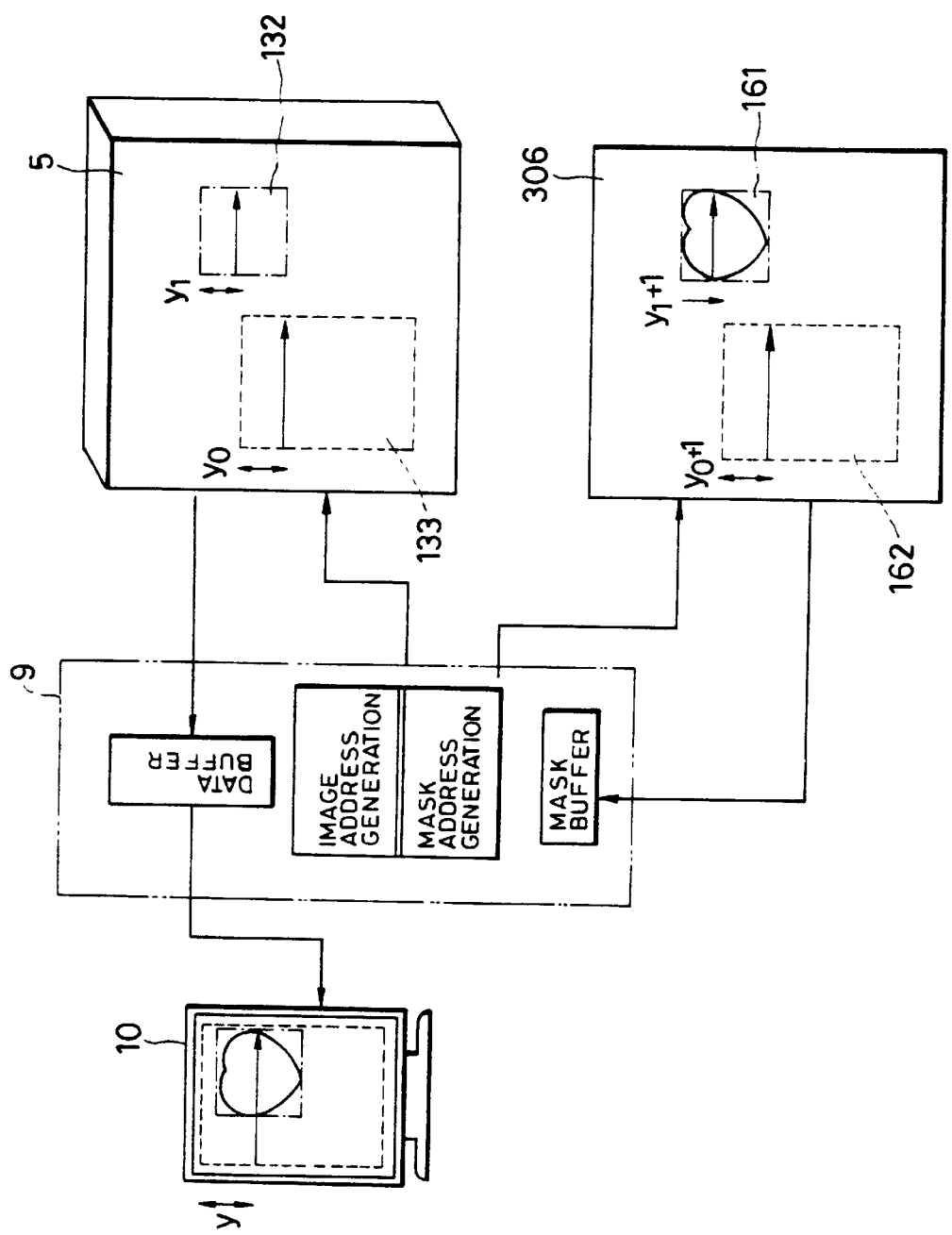
Figure 29:
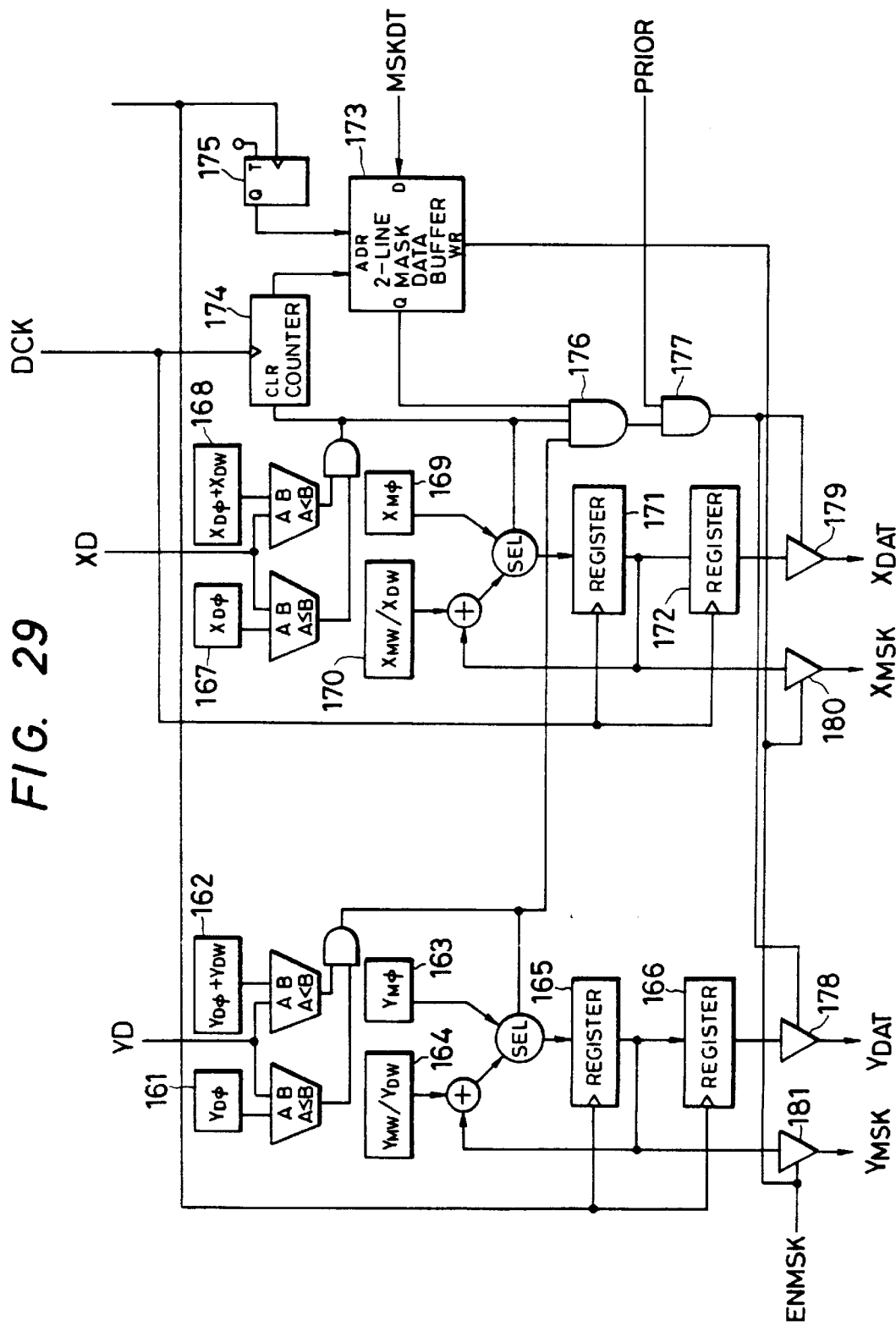

FIG. 28 shows a function of the CRT controller capable of synthesizing images of arbitrary shapes on the CRT. There is provided a mask shape memory 306 in which, in the illustrated example, mask area 162, 161 are defined respectively for image areas 133, 132. A heart shaped mask is stored in the mask area 161. As displayed on the CRT 10, the image area 132 is extracted in a heart shape and superposed on the image area 133. In such process, the CRT controller 9 reads the mask shape memory 306 prior to reading the image memory 5. In the present embodiment, the mask control is achieved by reading a preceding line in the vertical direction. More specifically, when a raster $y_0$ from the start of the area 133 and a raster $y_1$ from the start of the area 132 are to be displayed on a vertical address y of the CRT 10, a line $y_0+1$ in the mask area 162 and a line $y_1+1$ in the mask area 161 are read in the mask shape memory 306 in preparation for the display at the vertical address y+1 of the CRT 10. FIG. 29 shows an embodiment of the CRT controller, corresponding to a pair of horizontal and vertical modules shown in FIG. 27. In FIG. 29, registers 161, 162, 167, 168 for holding display addresses control rectangular areas defined by said registers on the CRT display. A 2-line mask data buffer 173, capable of holding mask data of two rasters constitutes the main feature of hte present embodiment. The mask data read in advance by a vertical address are designated by a counter 174, and supplied to a logic circuit 176, which releases a true signal if an address $X_D$, $Y_D$ on the display generated by an unrepresented counter is included in a rectangular area to be handled by said modules and if the mask data are turned on. Said true output signal is supplied to a logic circuit 177 to drive data address buffers 179, 178 so as to release memory addresses $X_{DAT}$, $Y_{DAT}$ when a signal PRIOR from module of a higher priority is true. Mask data MSKDT are continuously stored in the mask data buffer 173 even during the transfer of the data to be displayed. The mask data to be employed have to be read from the mask shape memory 306 ahead of the display data address, so that the address is obtained from mask address registers 165, 171 holding addresses which are ahead, by a line, of those of data address registers 166, 172. If there are plural modules, plural modules may try to conduct mask reading at the same time. Such collision is prevented by time-shared use of the mask address bus with a mask enable signal ENMSK. As explained in the foregoing, the present embodiment allows to superposition of images of arbitrary shapes with a high precision and with a high speed. The CRT controller of the present embodiment is capable of superposing without modification in the image data themselves, thereby enabling image processing without any waiting time.

In the following there will be explained the function and operation of image editing.

Tab. 1 below summarizes the image editing functions of the image processing apparatus of the present invention.

TABLE 1

| A/B | Item | Contents |
|---|---|---|
| B | AFFINE conversion | image movement · mag-change · rotation |
| A | color correction color conversion | color correction/conversion of image |
| A | contour correction | contour correction of image |
| A | extraction | extraction of image |
| B | synthesizing | synthesizing of plural images |
| A | others | airbrush correction · image copy, etc. |

Figure 30:
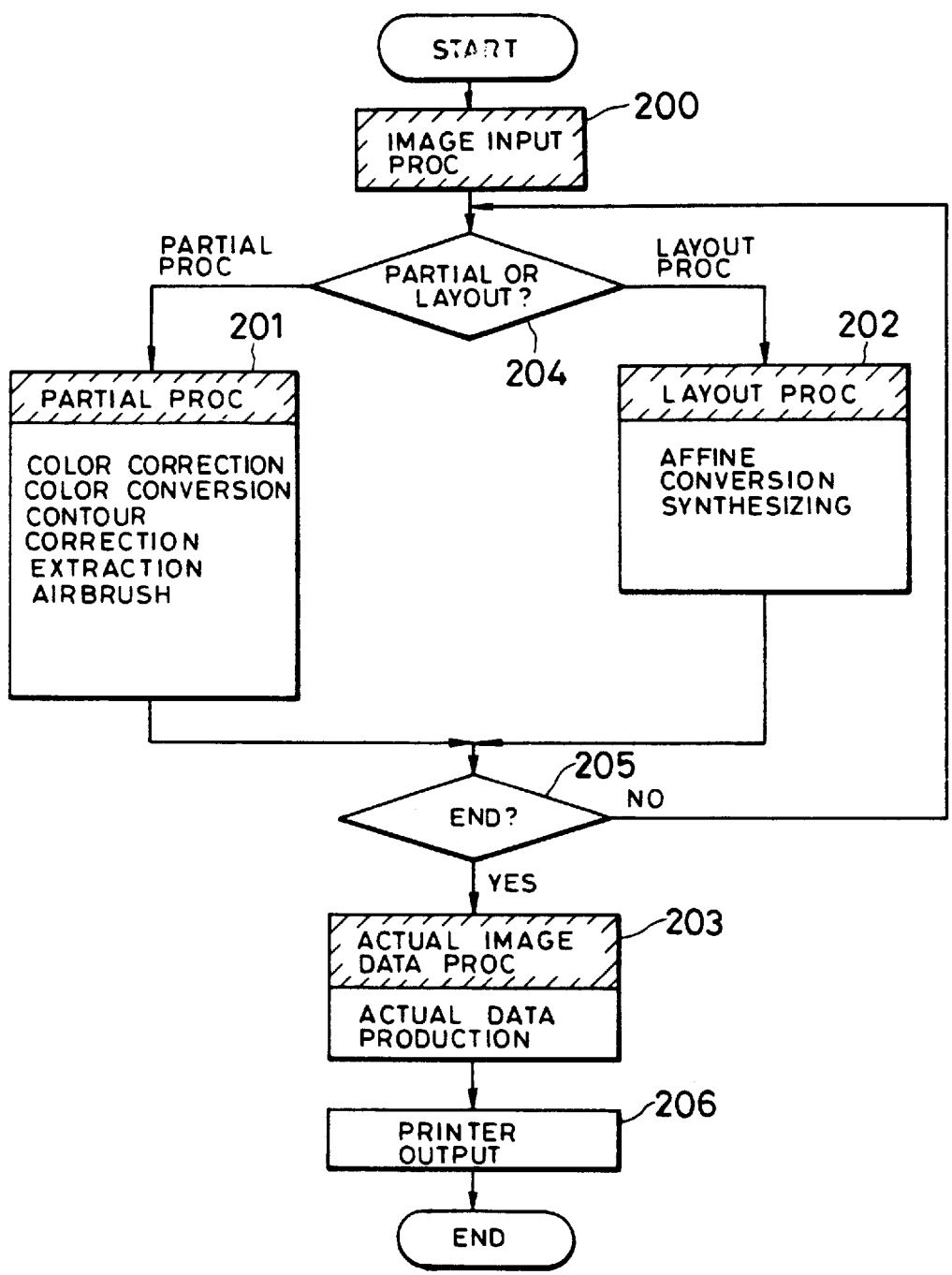
FIGS. 30, 31, 32, 33 and 34 are flow charts of image processing procedures.

FIG. 30 shows a schematic flow chart of image editing, and let us consider a case of synthesizing plural images.

An image input process 200 indicates an operation of reading and storing said plural images in an image file memory. The aforementioned compressed data are employed in this operation in order to reduce the file capacity. Then a step 204 selects a partial process or a layout process. The partial process if for correction or conversion in an image, and corresponds to an item A in Tab. 1. A layout process 202 determines the layout of plural image data completed as components, and effects an affine conversion such as rotation, change in magnification or displacement of the image, and a synthesis of image, corresponding to an item B in Tab. 1.

The partial process has to be conducted by a direct conversion of image data, but the layout process can be achieved by memorizing parameter information of layout, such as rate of change in image magnification, angle of rotation or position after displacement. Consequently the layout process can be conducted by displaying image data on the display and extracting parameter therefrom.

After such processes, there is conducted an actual image data processing 203, in which partial data are synthesized on the image memory according to the layout parameters.

Thereafter the data of the image memory are transferred to the printer and there is conducted a step 206 of output on a printer.

Figure 31:
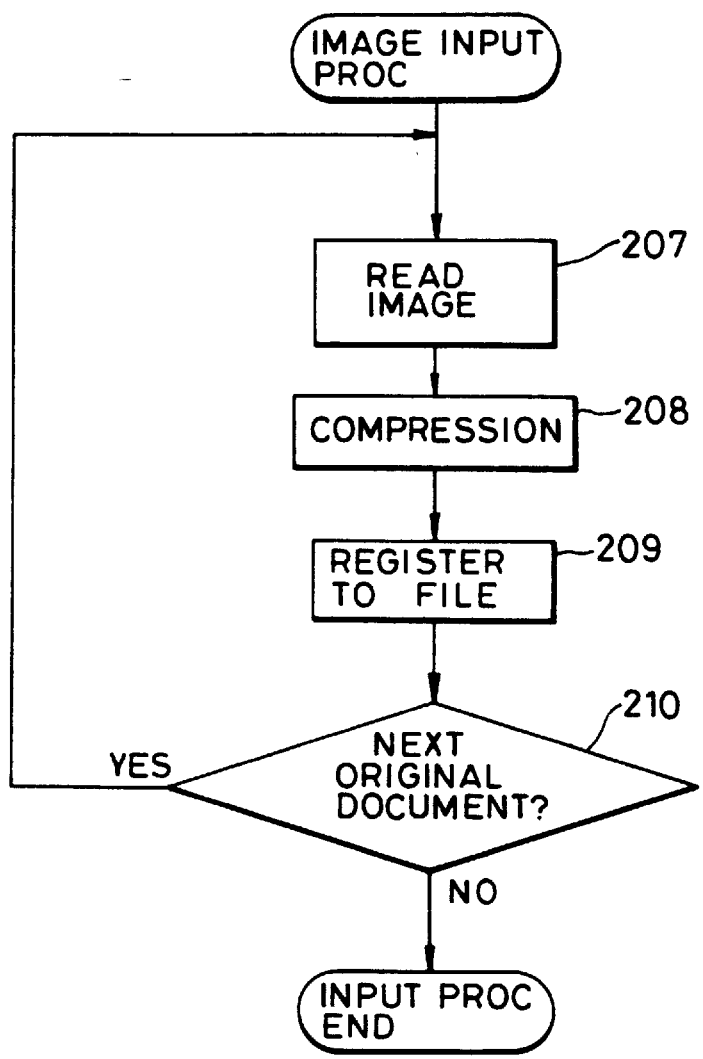

FIG. 31 shows the details of the image input process 200, wherein an original image is read by the reader (207), then the obtained data are compressed by the aforementioned compressor (208), and stored as a file, for example in a rigid disk memory. This operation is repeated until all the images are read (210).

Figure 32:
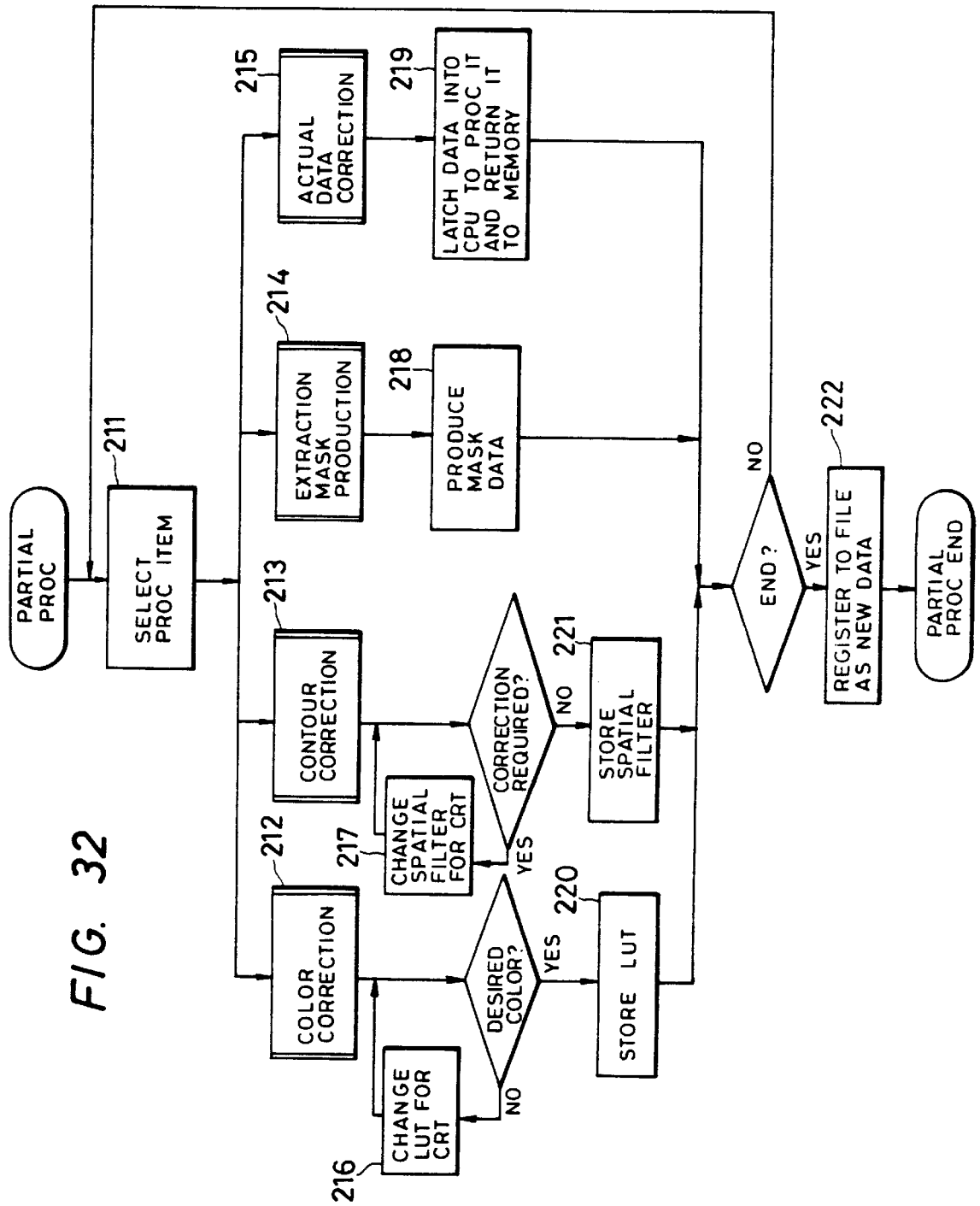

FIG. 32 shows the details of the partial process, wherein a step 211 at first selects the item of process to be conducted. A color correction step 212 transfers the image data from the file to the image memory, whereby said data are immediately displayed as the image memory also functions as a video memory for display, and the operator executes color correction while watching the display. This color correction is achieved not by varying the image data in the image memory but by varying a look-up table for the output to the display (CRT) (216). The look-up table is memorized when the image has become acceptable (220).

A contour correction 213 is achieved by placing a spatial filter operator on a cable for output to the CRT, and the actual image data are not changed. Then the data of the spatial filter, for example already known Laplacian coefficients, etc., are memorized (221). Also an extraction mask preparation (214) is achieved by varying a mask memory of 1-bit plane, placed parallel to the image memory. This operation defines the image area, but does not change the actual image data (218). Another process, called actual data correction 215, rewrites the actual image data on the image memory by direct access from the CPU, and is used for writing an image on the actual or erasing or copying a part thereof. After the above-explained process, actual data and mask data are registered as a file (222).

Figure 33:
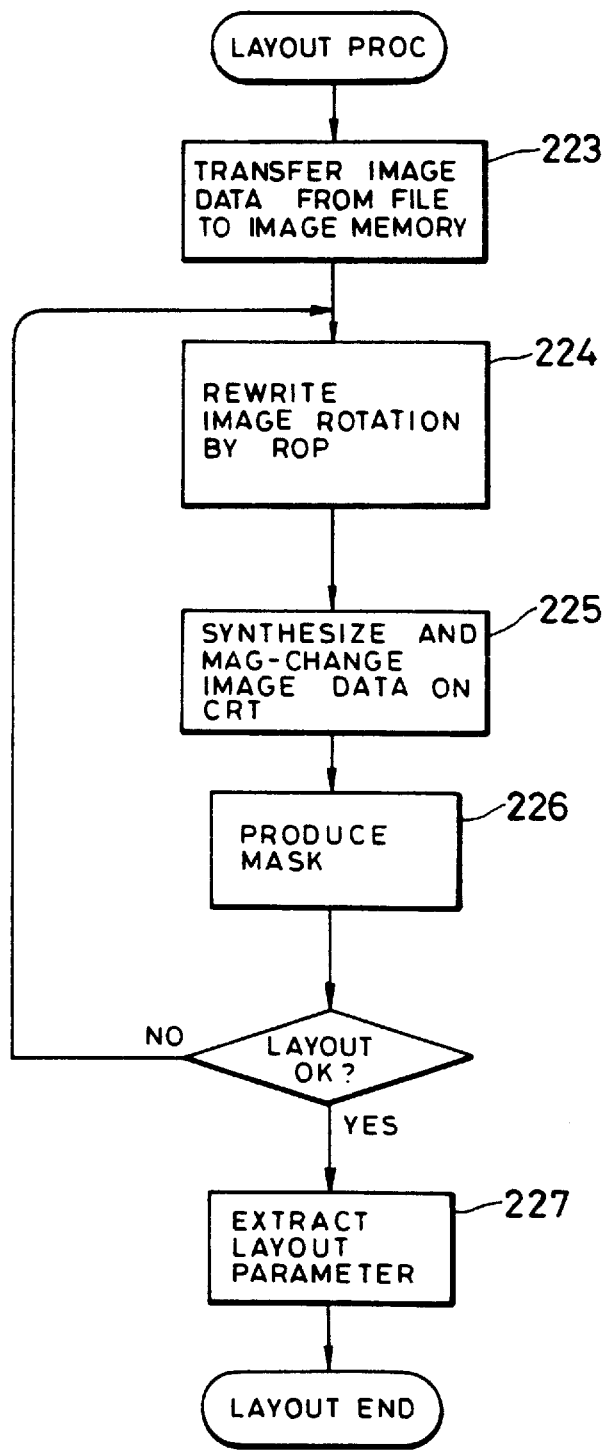

FIG. 33 shows a procedure for layout process.

At first image data are recorded in the image memory (223). In this step the data of plural images are stored in a reduced amount of data as explained before. Said data of plural images are synthesized and modified in magnification in the CRT controller (225) and supplied to the display. In this state, the rotation of image is achieved by rewriting the image in another area of the image memory by a raster operation of the affine converter 4 (224). The CRT controller can only vary the image magnification by an integer, and a variation of the magnification with an arbitrary factor is conducted by the affine converter 4. Then data are prepared (226) for the mask memory for defining the area of image output. The foregoing operations are conducted for each image, and layout parameters are extracted (227).

Figure 34:
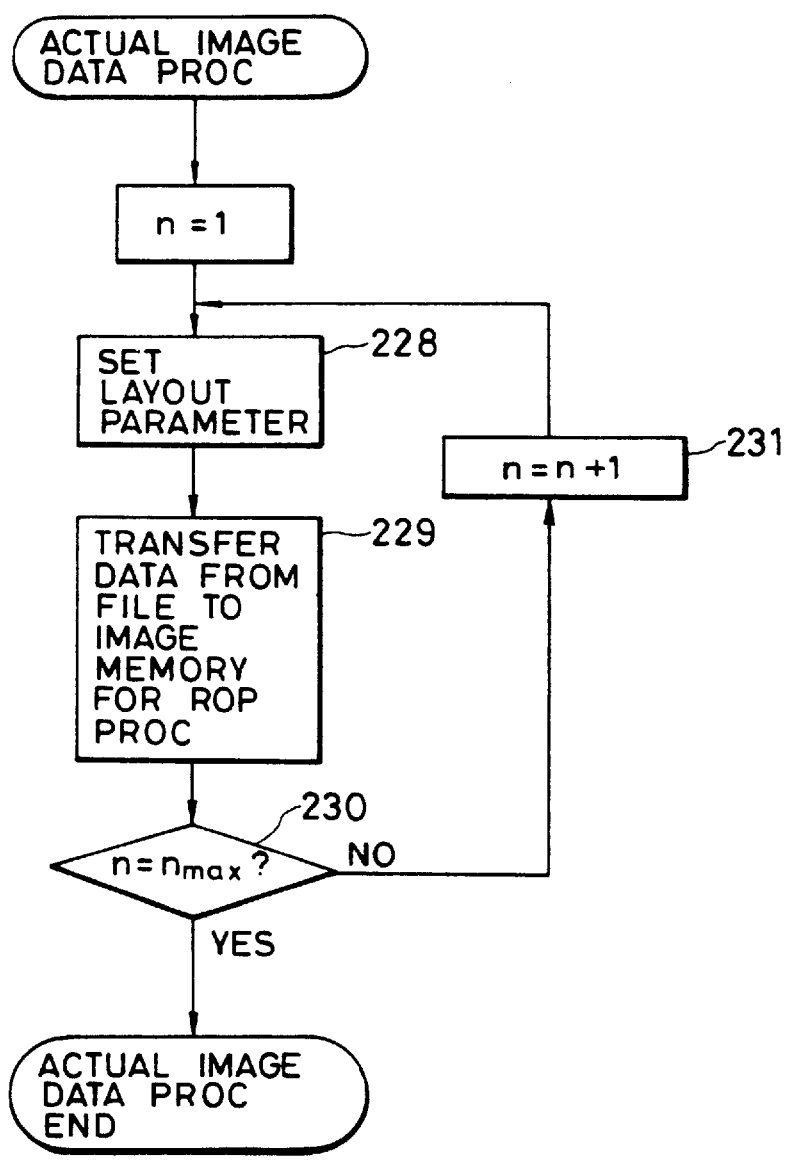

FIG. 34 shows a procedure of forming the final image from the partial data and the layout parameters explained above, and this procedure can be made fully automatic. The process starts from the partial image data to be laid in the background. At first the layout parameters and the mask data of a first image are set in a register for pipeline affine conversion, a look-up table, a mask memory provided parallel to the image memory. Then the data from the file are transferred to the image memory through said pipeline processors, thereby effecting a process by a raster operation.

Such process is repeated by the number of partial data ($n_{max}$), and the obtained data are overwritten on the image memory (230, 231).

The process in the present embodiment is conducted in the above-explained manner.

Second Embodiment

Figure 35:
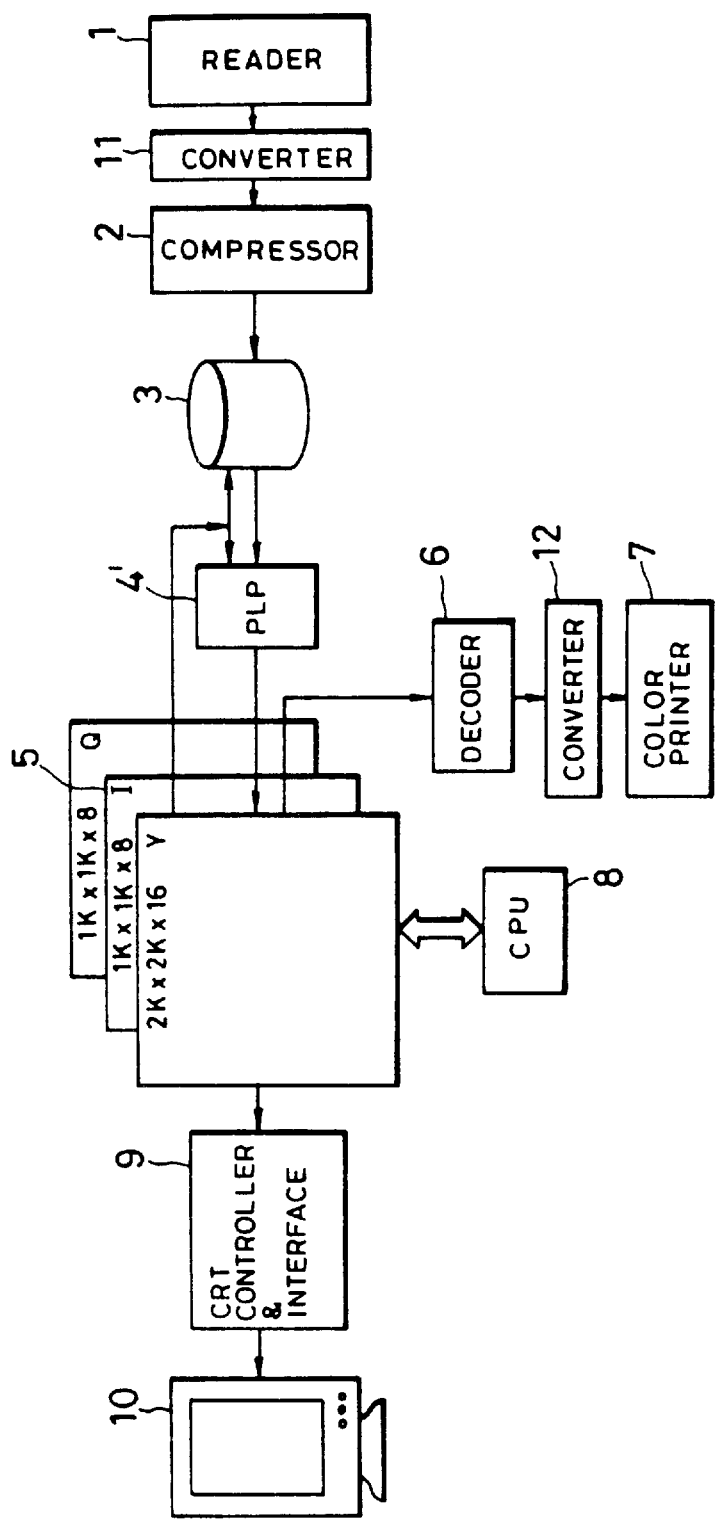
FIG. 35 is a block diagram of a color image processing apparatus constituting a second embodiment of the present invention.

FIG. 35 is a schematic view of an image editing apparatus constituting a second embodiment of the present invention.

Image data, obtained by the reader 1 and composed for example of 8 bits per pixel for each of red, green and blue signals, are converted by a converter 11 to obtain a luminance signal Y and color difference signals I, Q employed in the NTSC system. Such conversion can be achieved by a following matrix calculation of the red, green and blue data in the following manner:

$$\begin{pmatrix} Y \\ I \\ Q \end{pmatrix} = \begin{pmatrix} 0.3 & 0.59 & 0.11 \\ 0.6 & -0.28 & -0.32 \\ 0.21 & -0.52 & 0.31 \end{pmatrix} \begin{pmatrix} R \\ G \\ B \end{pmatrix}$$

wherein the coefficients may be suitably adjusted according to the color separating characteristics and gamma characteristics of the reader. Said signals Y, I, Q are compressed by a compressor 2 and stored in a disk memory 3 constituting an image data file. The image data in said disk are then read to an IC memory, constituting an image memory 5, for processing or editing. For achieving a high-speed process, basic processes are executed, by a pipeline processor 4', formed as a hardware, through a raster operation, in the transfer from the disk to the image memory 5.

The image data on the image memory 5 are processed and edited by a CPU 8. The procedure of image editing is displayed on a color CRT 10 by a CRT controller 9 for monitoring. The edited result is converted into image data by a decoder 6, and then converted by a converter 12 into color signals of yellow, magenta, cyan and black for supply to a color printer 7.

In the following there will be explained the method of compression of image data. In a three color signal system composed of the luminance signal Y and color difference signals I and Q, it is already known that the visual image quality can be maintained by preserving the spatial frequency of the luminance signal Y, even if the spatial frequency of the color difference signals I, Q are limited to a certain extent in the high-frequency region.

It is therefore considered, in data compression, to reduce the amount of data of a color image by representing the color information in the color difference signals I, Q, for example by the average value in an m×m block wherein m is an integer. The size of said block is selected, for example, as 2×2, 4×4, 6×6, ect., according to the variable memory capacity. As an example, in case of a block size of 4×4, the aforementioned memory capacity of 48 Mbyte required for an A4-sized image can be reduced to the Y-signal of 16 Mbyte and I, Q signals of 2 Mbyte, or a total of 18 Mbyte, with a compression rate of ca. 2.7.

Different from the compression of the signals I, Q, the luminance signal Y requires a compression which satisfactorily preserves the data on resolving power.

Figure 36A:
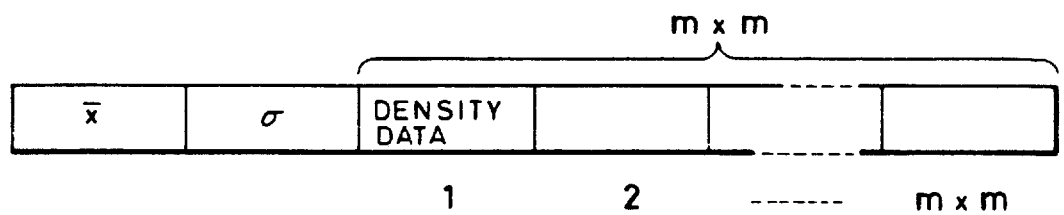
FIGS. 36A and 36B are views of encoded data formats.

A first conceivable method is block encoding. In this method the average $\bar{x}$ and standard deviation $\sigma$ are calculated on the pixel data x in the m×m block. The density of each pixel is represented by several bits, for example by requantizing $(x-\bar{x})/\sigma$. FIG. 36A shows the format of thus compressed data, in which the average value and the standard deviation are followed by the density information in the order to positions of pixels in the block. Consequently a rotation of the pixels in the block can be achieved by changing the sequence of the density information.

A second conceivable method is vector quantization of m×m pixels.

Figure 36B:
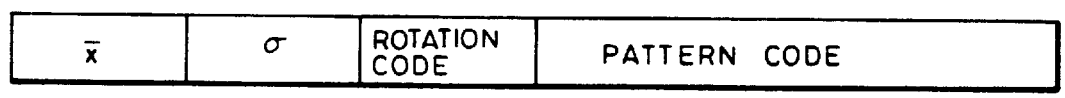

In this method, the pixel data in the m×m block are represented by the average value $\bar{x}$, standard deviation $\sigma$, a code indicating image rotation and a code representing image pattern, in order to achieve data compression. FIG. 36B shows the corresponding data format, wherein the rotation code indicates the angle of rotation of the image pattern in the m×m block, and, in the present embodiment, indicates an angle of 0°, 90°, 180° or 270° in two bits.

In this method, the pixels in the block can be rotated by a change in the rotation code.

Also in this second embodiment, an affine conversion is conducted in the same manner as in the first embodiment.

However the affine conversion in the second embodiment is conducted by entering raster source data from the file, reader or image memory, and storing said data in random access in a destination memory, for which the image-memory is utilized. Thus the affine conversion can be achieved at a very high speed, by means of a pipeline converter, in the course of data transfer from the file to the image memory, in successive manner. The image data are in the aforementioned compressed form, and the address is defined in an address space corresponding to the compressed data.

After the determination of the addresses of the encoded data after the affine conversion, there is conducted permutation of the image data in the block, as will be explained in the following for a case of a 2×2 block.

Figure 37A:
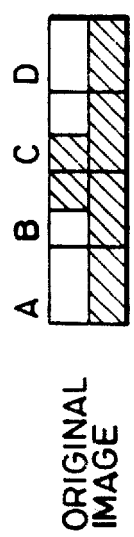
FIGS. 37A to 37G are schematic views showing the concepts of block rotation and in-block rotation.
Figure 37B:
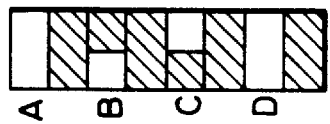
Figure 37C:
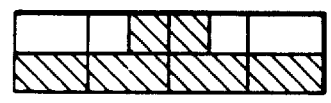
Figure 37D:
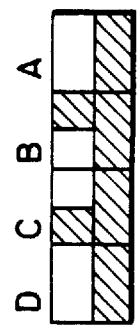
Figure 37E:
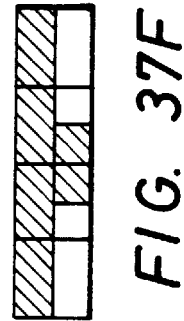
Figure 37F:
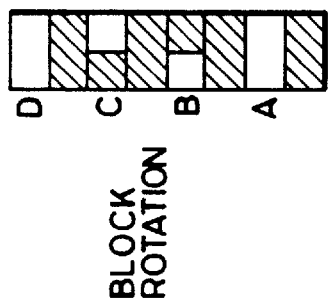
Figure 37G:
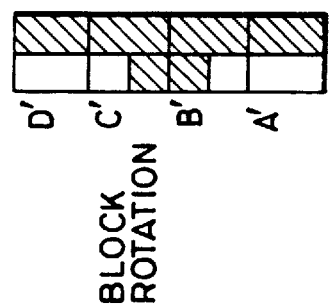

FIG. 37A shows data of 4 blocks A, B, C, D constituting an original image. If addresses are generated and stored in the destination memory by the above-explained rotation process for a block rotation of 90°, 180° or 270°, the resulting image does not faithfully reproduce the original image, as shown in FIGS. 37B, 37C or 37D. Consequently the pixels in each block are rotated according to the angle of rotation to achieve faithful reproduction as shown in FIG. 37E, 37F or 37G, respectively representing a rotation of the pixels of each block by 90°, 180° or 270°. Said rotation can be achieved by varying the rotation code of 2 bits shown in FIG. 36B, without modifying the pattern codes.

Figure 38:
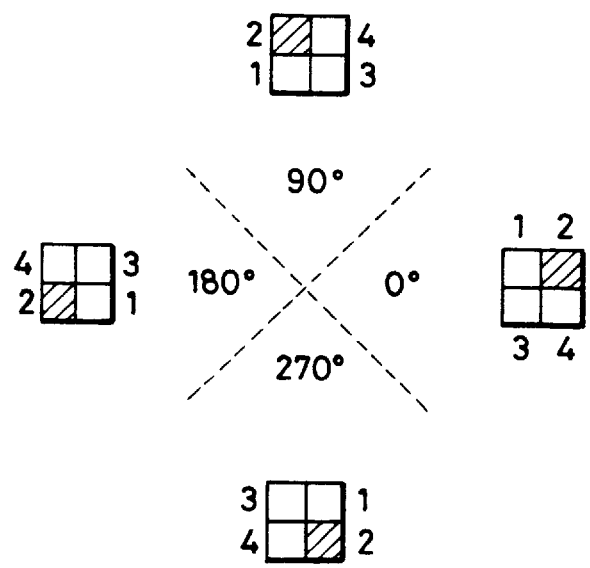
FIG. 38 is a view showing an in-block rotation.

For a rotation of an arbitrary angle, the rotation in block is selected respectively in four ranges of image rotation of 90° each. As shown in FIG. 38, the angle of image rotation is divided into four ranges of 315°–45°, 45°–135°, 135°–225° and 225°–315°, and a rotation in the block of 0°, 90°, 180° or 270° is respectively selected.

Figure 39A:
FIGS. 39A to 39D are views showing processes to which codes are subjected by rotation.
Figure 39B:
Figure 39C:
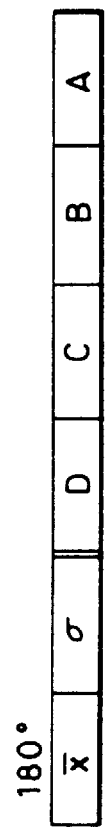
Figure 39D:

FIGS. 39A to 39D show examples in the block encoding format shown in FIG. 37A, of reformatting by rearrangement by rotation in the block, respectively corresponding to a rotation of 0°, 90°, 180° or 270°. The data $\bar{x}$ and $\sigma$ are not changed, and the succeeding density data are permurated. The original data sequence ABCD shown in FIG. 39A, corresponding to a rotation of 0°, is changed to BDAC as shown in FIG. 39B corresponding to a rotation of 90°, or DCBA as shown in FIG. 39C for 180°, or CABD as shown in FIG. 39D for 270°.

Figure 40:
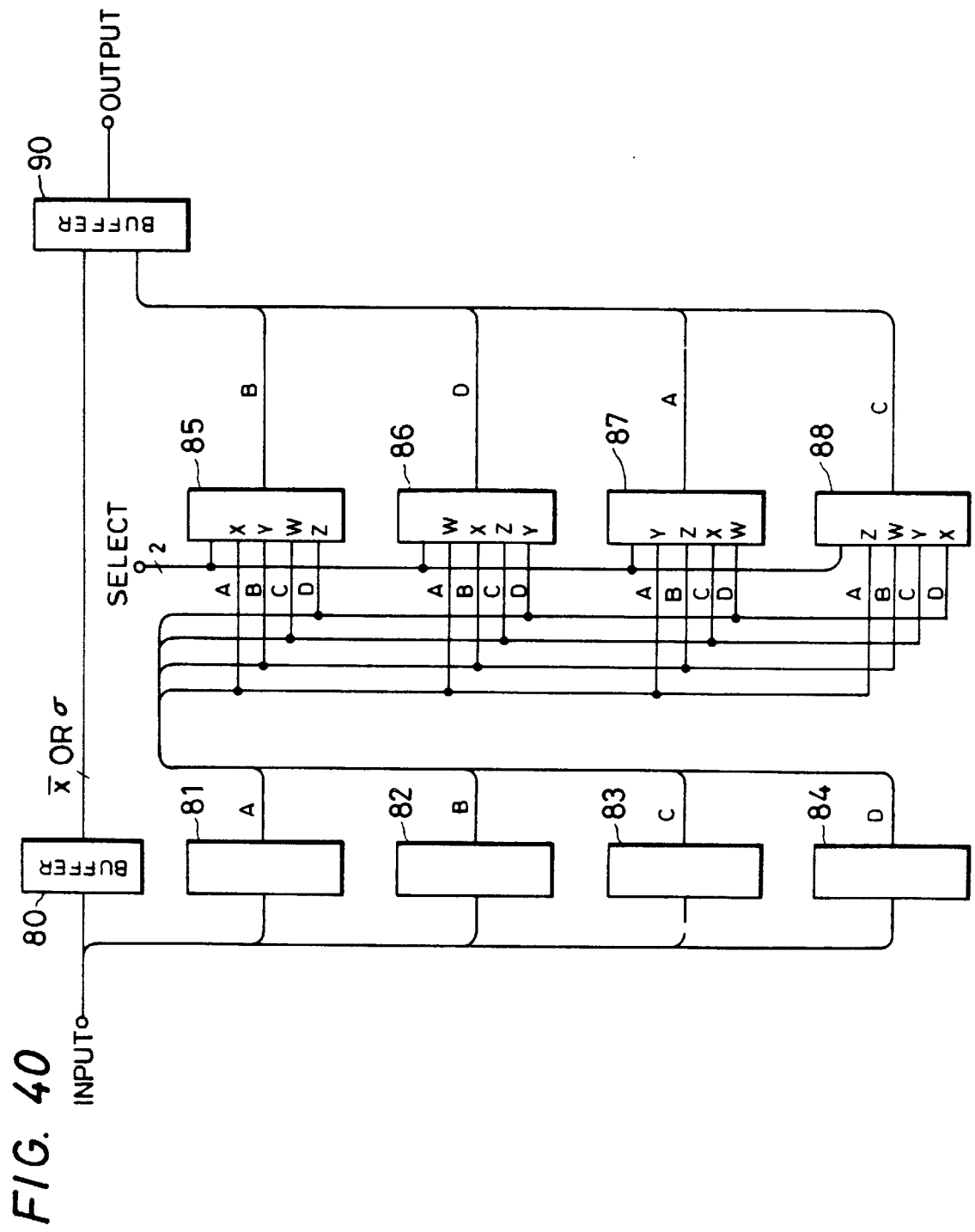
FIG. 40 is a block diagram of a rotating circuit.

FIG. 40 shows an embodiment of a circuit for converting the data format in the block, wherein the input signals $\bar{x}$, $\sigma$ are stored in a buffer 80, and the succeeding density data are separately stored in buffers 81, 82, 83, 84. Selectors 85, 86, 87, 88 receive select signals corresponding to the angle of rotation, from an unrepresented controller. For example there is employed a select signal of 2 bits, in which 0, 1, 2 and 3 respectively corresponding to an angle of 0°, 90°, 180° and 270°. Output lines A, B, C, D of said buffers 81, 82, 83, 84 are connected to input lines X, Y, Z, W of the selectors 85, 86, 87, 88 in different permutations. As an example, in response to the select signal "1", each selector releases a signal received at the input terminal Y, whereby signals B, D, A and C are respectively obtained from the selectors 85, 86, 87 and 88. These output signals are combined with $\bar{x}$ and $\sigma$ in a buffer 90 to obtain an output data format as shown in FIG. 39.

In the foregoing embodiment of block rotation and in-block rotation of the encoded data, the affine conversion is achieved by a combination of a collective rotation of compressed data of an m×m block, and a rotation of compressed data in said m×m block. In order to minimize the deterioration in image quality associated in such operations, (1) the luminance signal Y is subjected to block encoding or vector quantization in a small matrix $m_0 \times m_0$; and
(2) the color difference signals I, Q, only requiring a relatively low resolving power for human eyes, are subjected to block encoding in a relatively large matrix $m_1 \times m_1$ ($m_1 > m_0$), or vector quantization, or direct averaging.

Description of the function of the CRT 9, mode of image editing and required operation will be omitted since these are same as in the first embodiment.

Third Embodiment

Figure 41:
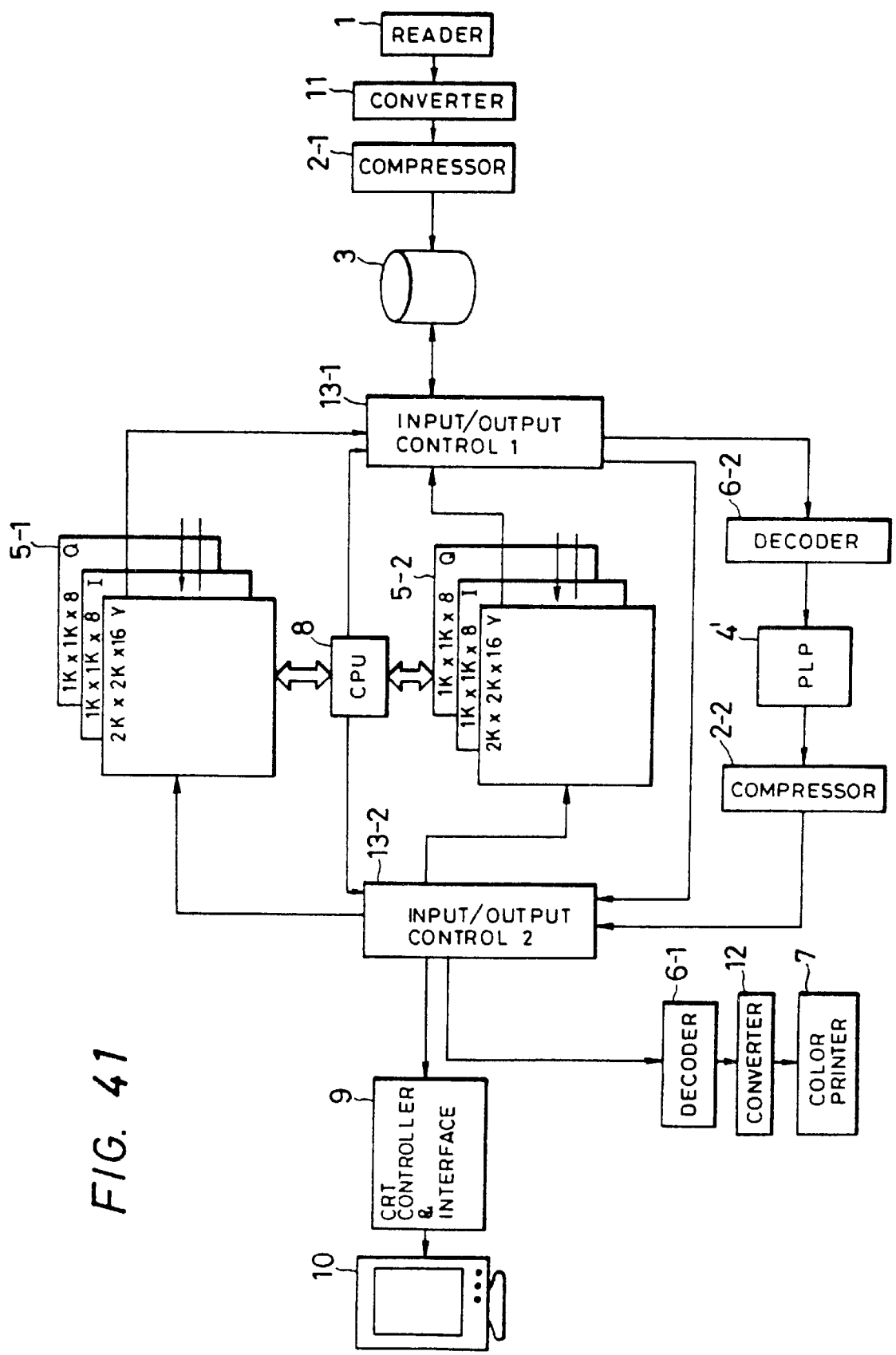
FIG. 41 is a schematic view of an image processing apparatus constituting a third embodiment of the present invention.

FIG. 41 is a schematic view of an image editing apparatus constituting a third embodiment of the present invention, The method of compression of image data is conducted in the same manner as in the second embodiment and will therefore not be explained further.

In the following there will be explained the affine conversion employed in the third embodiment for enlargment reduction, displacement or rotation of the image.

As in the first embodiment, output memory address ($x_D$, $y_D$) can be defined in the following equations, by input memory address ($x_s$, $y_s$) of the input image, an image magnification a in the main scanning direction, an image magnification β in the sub-scanning direction, a rotation angle φ, a coordinate ($x_c$, $y_c$) of the center of rotation, an amount of displacement $x_m$ in the main scanning direction and an amount of displacement $y_m$ in the sub-scanning direction:

$$\begin{pmatrix} x_s \\ y_s \end{pmatrix} = \begin{pmatrix} \cos\phi & \sin\phi \\ -\sin\phi & \cos\phi \end{pmatrix} \begin{pmatrix} 1/\alpha & 0 \\ 0 & 1/\beta \end{pmatrix} \begin{pmatrix} x_D - x_m - x_c \\ y_D - y_m - y_c \end{pmatrix} + \begin{pmatrix} x_c \\ y_c \end{pmatrix} \quad (1)$$

$$x_s = 1/\alpha\cos\phi \times x_D \times 1/\beta\sin\phi \times y_D + (1/\alpha\cos\phi) \times x_C - 1/\beta\sin\phi \times y_c - 1/\alpha\cos\phi \times x_m - 1/\beta\sin\phi \times y_m \quad (2)$$

$$y_s = -1/\alpha\sin\phi \times x_D + 1/\beta\cos\phi \times y_D + 1/\alpha\sin\phi \times x_c + (1 - 1/\beta\cos\phi) \times y_c + 1/\alpha\sin\phi \times x_m - 1/\beta\cos\phi \times y_m \quad (3)$$

```
                                                                       | parallel displacement in main scan. direction
                                                            | parallel displacement in main scan. direction
                                                 | address of center of conversion (sub-scan. direction)
                                       | initial offset
                              | address of center of conversion (main scan. direction)
                    | destination address (sub-scan. direction)
           | increment in synchronization in main scanning
   | destination address (main scan. direction)
| increment in synchronization in main scanning
source address
``` wherein image data, obtained by the reader 1 and composed for example of 8 bits per pixel for each of red, green and blue signals, are converted by a converter 11 into a luminance signal Y and color difference signals I, Q of the NTSC signal system. Such conversion is achieved by a matrix calculation shown in the following:

$$\begin{pmatrix} Y \\ I \\ Q \end{pmatrix} = \begin{pmatrix} 0.3 & 0.59 & 0.11 \\ 0.6 & -0.28 & -0.32 \\ 0.21 & -0.52 & 0.31 \end{pmatrix} \begin{pmatrix} R \\ G \\ B \end{pmatrix}$$

wherein the coefficients are suitably adjusted according to the color separation characteristics, and gamma characteristics of the reader. Said signals Y, I, Q are compressed by a compressor 2-1 and stored in a disk memory 3 constituting an image data file. The image data in said disk are then read to IC memories, called image memories 5-1, 5-2 for processing and editing. For achieving high-speed process, basic processings are conducted by a pipeline processor 4' implemented as hardware in the course of data transfer from the disk to an image memory, and editing is conducted in the course of data transfer from said image memory to the other image memory in the form of raster data.

The image data on the image memory 5 are processed and corrected by a CPU 8, and the procedure of editing is displayed on a color CRT 10 by a CRT controller 9 for monitoring. The result after editing is converted to the image data by a decoder 6, and further converted by a converter 12 into color signals of yellow, magenta, cyan and black corresponding to a color printer 7. In these operations, the CPU 8 controls the flows of data before and after processing, through input/output control units 13-1, 13-2.

Figure 42:
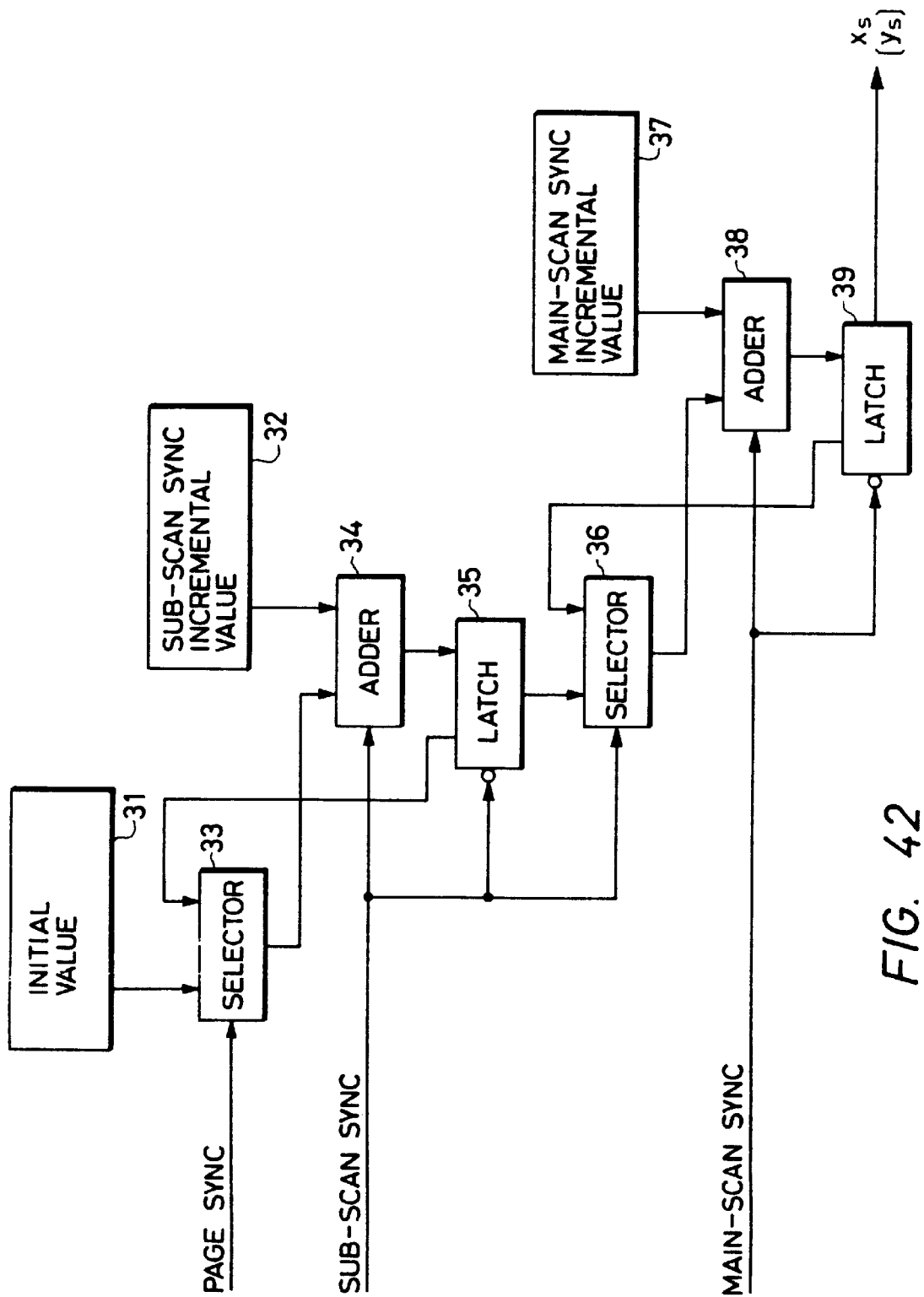
FIG. 42 is a block diagram of an address generator of an affine converter.

The values $x_s$, $y_s$ are determined according to the equations (2), (3) from the given values of $x_D$ and $y_D$, for example by a circuit shown in FIG. 42. In case of determining $x_s$ according to the equation (2), an initial offset value is set in a register 31, and increments of synchronization in the sub-scanning and main scanning directions are respectively set in registers 32, 37. These settings are executed by the CPU according to the image magnification and rotation angle. The relation of a page synchronization signal, a sub-scanning synchronization signal and a main scanning synchronization signal is said circuit is shown in FIG. 4. In response to the downshift of the page synchronization signal, the sub-scanning synchronization signal is generated by the number of the scanning lines present in a page. In response to the downshift of said sub-scanning synchronization signal, the main scanning synchronization signal is generated by the number of data present in each scanning line. These signals are generated by an unrepresented synchronization signal generator. A selector 33 releases a value held by the initial value register 31 during the low-level state of the page synchronization signal. An adder 34 executes an addition in response to the downshift of the sub-scanning synchronization signal, and the output thereof is latched by a latch 35. Also a selector 36 releases the output of the latch 35 during the low-level state of the sub scanning synchronization signal. An adder 38 adds the output of the selector 36 and the increment 37 in synchronization of main scanning in response to the downshift of the main scanning synchronization signal, and the obtained output is latched by a latch 39 in response to the upshift of the main scanning synchronization signal. The latch 35 holds an input address corresponding to the start data of the scanning line, and the latch 39 provides input address corresponding to the data in each scanning line. The value $y_s$ can also be determined in the same manner according to the equation (3).

Figure 43:
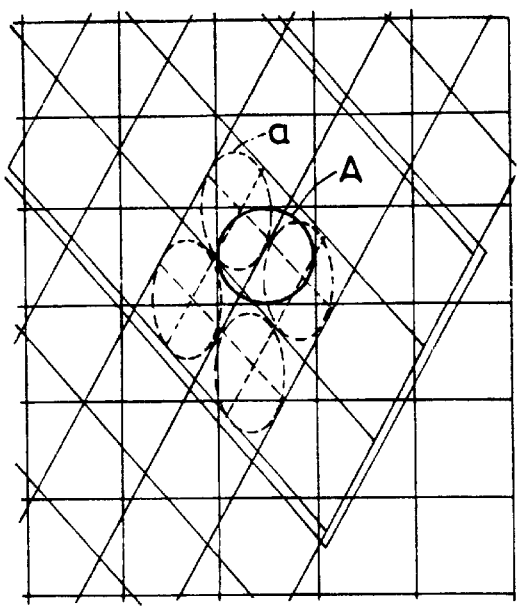
FIGS. 43 and 44 are charts showing the correlation of addresses between an original image and a processed image.
Figure 44:
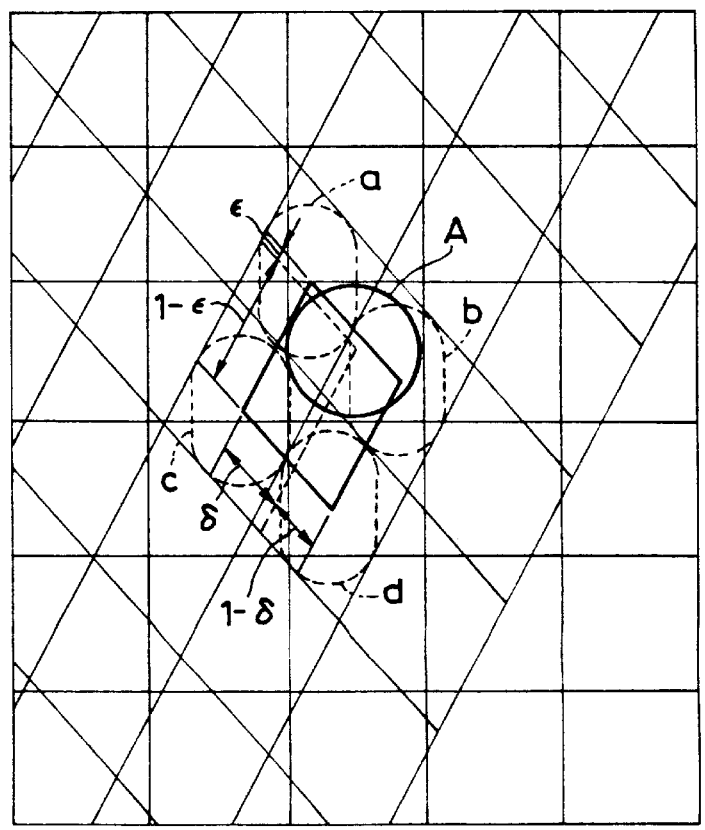

The address thus determined is irrational since cost, sinφ, etc., are generally irrational numbers. Such irrational number is represented by a fractional number with a sufficient number of bits, and an integral address close to such fractional number is selected as the input address. Output address ($x_D$, $y_D$) is obtained by interpolation from four input points obtained by the integral portion of $y_s$ and $x_s$ (discarding the fractional portion), and by adding 1 to said integral portion. FIGS. 43 and 44 show the correspondence between the source and destination addresses, wherein square lattices are destination address lattices, and the center of each square indicates an integral address. On the other hand parallelogram (rhomboidal) lattices indicate the source address lattices, and the center of each parallelogram rhomboidal corresponds to an integral address. For a point A($x_D$, $y_D$) in FIG. 43, there are determined four points a, b, c and d. As shown in FIG. 44, the value V(A) of said point A is determined from the values V(a), V(b), V(c) and V(d) of said points a, b, c, d according to the following equation:

$$V(A)=(1-\delta)(1-\epsilon)V(a)+(1-\epsilon)V(b)+(1-\delta)\epsilon V(c)+\delta\epsilon V(d) \qquad (4)$$

wherein δ and ε are respectively fractional portions of $x_s$ and $y_s$.

Figure 45:
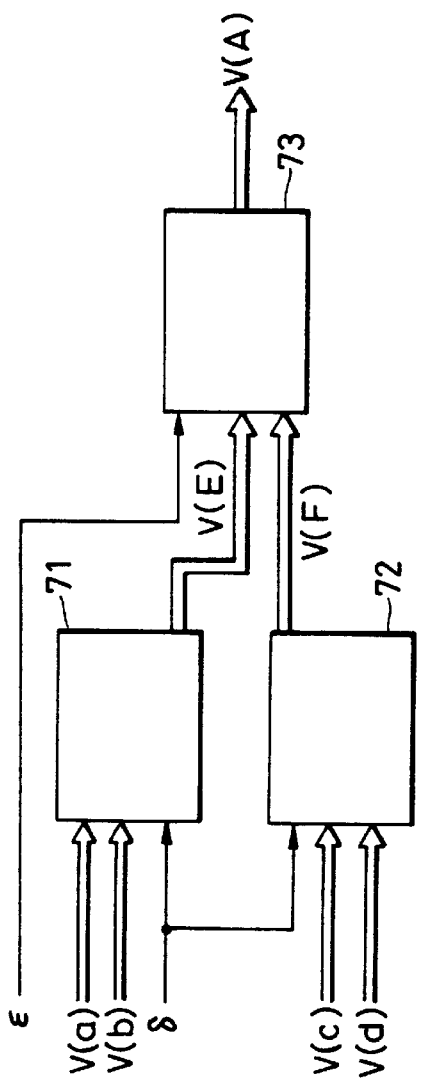
FIGS. 45 and 46 are block diagrams of a data interpolating circuit.
Figure 46:
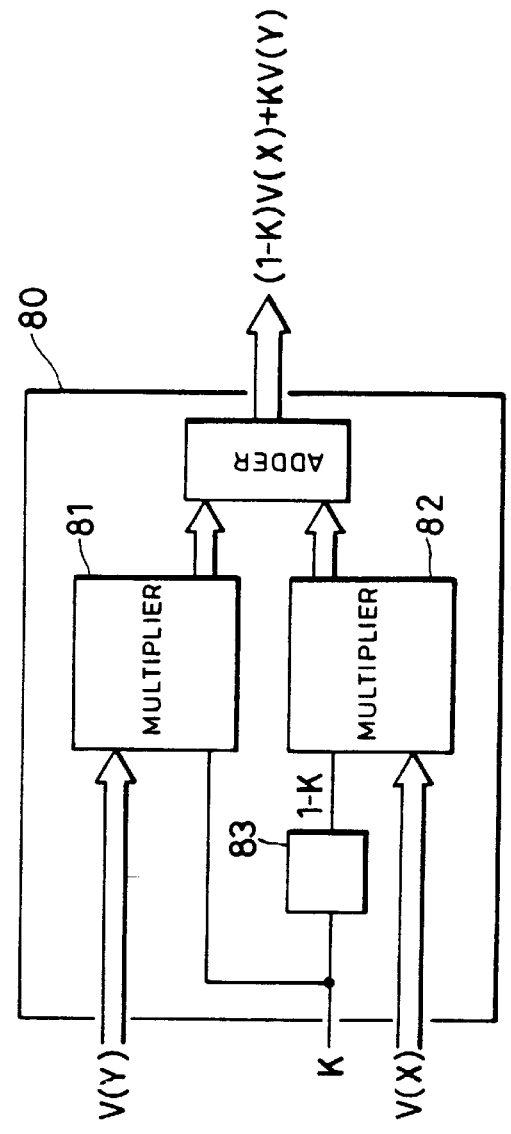

FIG. 45 is a block diagram of a circuit for executing a calculation according to the equation (4), wherein multipliers 81, 82, 83 have a structure shown in FIG. 46, and a circuit 83 determines 1−k from the fractional portions k of $x_s$ and $y_s$. In FIG. 45, $$V(E)=(1-\delta)V(a)+\delta V(b)$$

$$V(F)=(1-\delta)V(c)+\delta V(d)$$

The output data thus obtained after the affine conversion are supplied from a PLP 4' to a compressor 2-2, and supplied, after re-compression, to the image memory 5-1 or 5-2.

Figure 47:
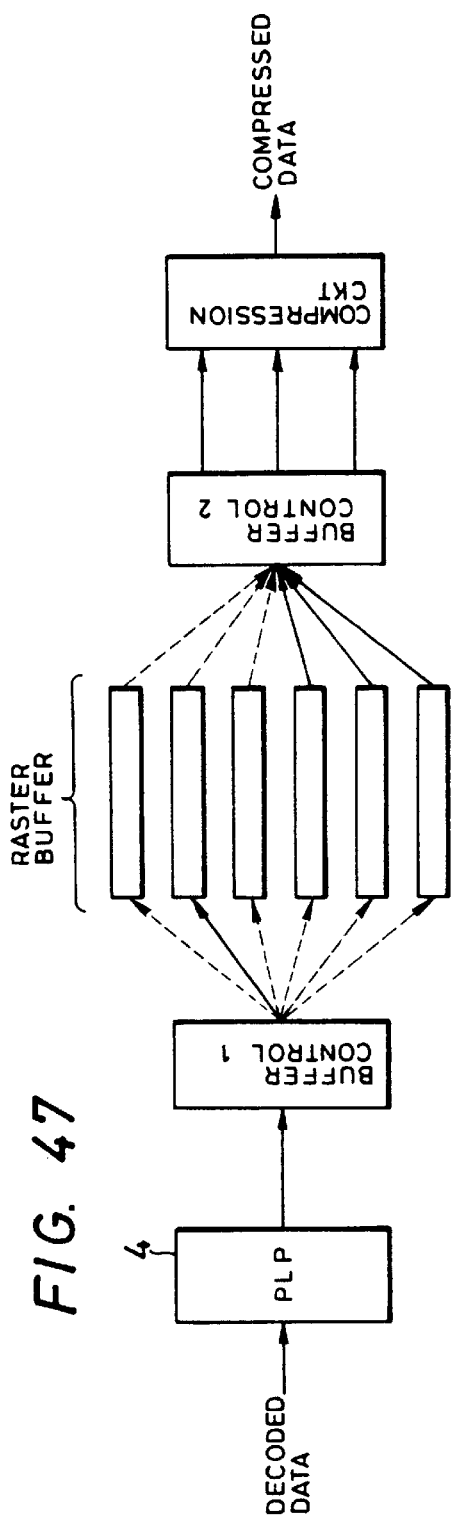
FIG. 47 is a schematic view of a compressing process after a pipeline process.

The compressor is provided with two sets of line buffers of a number of rasters required for compression, and a set is employed for fetching the output data from the PLP 4', while the other set is use for compressing the already fetched data for supply to the image memory, as illustrated in FIG. 47.

The affine conversion in the present embodiment is conducted by supplying raster data, read in succession from the file, to the destination side, and entering the original data by random access to the source memory, composed of the image memory in the present embodiment. An extremely high speed conversion can be achieved in the course of data transfer from the source image memory to the destination image memory, since the affine conversion is executed by pipeline hardware.

The function of the CRT controller, mode of image editing and required operation will not be explained further as they are same as in the first embodiment.

Fourth Embodiment

Figure 48:
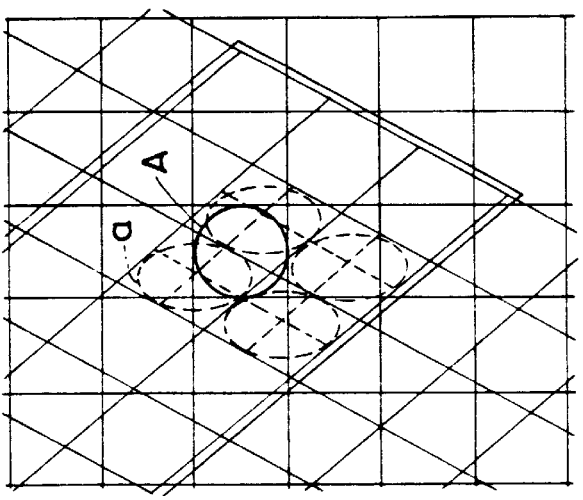
FIG. 48 is a chart showing the correlation between an original image and a processed image in an affine conversion in a fourth embodiment of the present invention.

In this embodiment, the source address is determined from the source address in the same manner as in the third embodiment. However, an output address ($x_D$, $y_D$) by discarding the fractional portions of $x_s$ and $y_s$. FIG. 48 shows the relationship between the source and destination addresses, wherein square lattices are destination address lattices and the center of each square indicates an integral address. Also parallelogram (rhomboidal) lattices are source address lattices and the center of each parallelogram rhomboid indicates an integral address. A point b is determined corresponding to a point ($x_D$, $y_D$) shown in FIG. 48, and the value of said point b is represented by that of the point A.

The affine conversion in the present embodiment is achieved by supplying the raster data, obtained in succession from the file, to the destination side, and entering the original data by random access to the source memory, which is the image memory in this case. Consequently the affine conversion is conducted with an extremely high speed in the course of data transfer from the source image memory to the destination image memory, through the use of a pipeline converter formed as a hardware. The image data are in the compressed state as explained before, and the address is defined in an address space corresponding to such compressed data.

After the determination of address of encoded data following the affine conversion, the arrangement of data in each block is permutated in the same manner as in the second embodiment.

Also the function of the controller 9, mode of image editing and required operation will be omitted since they are same as in the first embodiment.

As explained in the foregoing, an embodiment of the present invention enables high-speed and advanced image editing through the use of a system architecture characterized by the storage of image data in compressed form, the decoding of thus compressed data prior to the image editing to enable precise image processing in pixel unit, and the image synthesis enabled not only in the memory but also on the display unit.

Also high-speed display and high-quality printing are rendered possible by block encoding of image data and employing different processes for the display and the printing.

Also the rate of data compression is improved, in block encoding of color image data, by representing the color information with color information of a predetermined number.

Furthermore it is rendered possible to synthesize images on a display unit, without employing a memory for storing the synthesized image.

Furthermore it is rendered possible to convert a predetermined color of an arbitrary area into another color through the use of mask information.

The present invention is not limited to the foregoing embodiments but is subjected to various modifications and applications within the scope and spirit of the appended claims.

What is claimed is:

1. An image processing apparatus comprising:
    storage means for storing encoded data representing a plurality of original images, the encoded data being obtained by encoding image data having a first resolution;
    decoding means for decoding the encoded data read out from said storage means and generating image data having the first resolution;
    converting means for converting the image data having the first resolution from said decoding means into image data having a second resolution which is lower than the first resolution;

first process means for processing only the image data having the second resolution from said converting means so as to generate image data having the second resolution representing a combined image of the plurality of original images;

memory means for storing a parameter which has been used for processing the image data having the second resolution by said first process means in order to obtain the combined image; and second process means for processing only the image data having the first resolution representing the plurality of original images from said decoding means in accordance with the parameter stored in said memory means so as to generate image data having the first resolution representing the combined image of the plurality of original images.

2. An apparatus according to claim 1, further comprising displaying means for displaying an image in accordance with the image data having the second resolution.

3. An apparatus according to claim 1, wherein said storage means stores encoded data obtained by encoding a plurality of color component image data.

4. An apparatus according to claim 3, wherein said decoding means generates the plurality of color component image data.

5. An apparatus according to claim 4, wherein said first and second process means perform a color conversion processing on the plurality of color component image data.

6. An apparatus according to claim 1, wherein said first and second process means perform a layout processing on the image data so as to move, rotate, enlarge or reduce the image.

7. An image processing method comprising:

a first storing step for storing encoded data representing a plurality of original images, the encoded data being obtained by encoding image data having a first resolution, in a storage medium;

a decoding step for decoding the encoded data read out from the storage medium and generating image data having the first resolution;

a converting step for converting the image data having the first resolution from the decoding step into image data having a second resolution which is lower than the first resolution;

a first process step for processing only the image data having the second resolution obtained at said converting step so as to generate image data having the second resolution representing a combined image of the plurality of original images;

a second storing step for storing a parameter, which has been used for processing the image data having the second resolution by the first process step in order to obtain the combined image of the plurality of original images, in a parameter memory; and a second process step for processing only the image data having the first resolution representing the plurality of original images from the decoding step in accordance with the parameter stored in the parameter memory so as to generate image data having the first resolution representing the combined image of the plurality of original images.

8. A method according to claim 7, further comprising a displaying step for displaying an image in accordance with the image data having the second resolution.

9. A method according to claim 7, wherein, at said first storage step, the encoded data obtained by encoding a plurality of color component image data is stored.

10. A method according to claim 9, wherein at said decoding step, the plurality of color component image data is generated.

11. A method according to claim 10, wherein at said first process step and said second process step, a color conversion processing is performed on the plurality of color component image data.

12. A method according to claim 7, wherein at said first process step and said second process step, a layout processing is performed on the image data so as to move, rotate, enlarge or reduce the image.

* * * * *

UNITED STATES PATENT AND TRADEMARK OFFICE
CERTIFICATE OF CORRECTION

PATENT NO. : 5,812,146

DATED : September 22, 1998

INVENTOR(S) : MAMORU SATO ET AL.

It is certified that error appears in the above-identified patent and that said Letters Patent is hereby corrected as shown below:

COVER PAGE AT [56], REFERENCES CITED AT OTHER PUBLICATIONS

"Image-Compressiong/" should read
--Image-Compressing/--.

"Techinque" should read --Technique--.

COLUMN 1

Line 23, "Crossfield" should read --Crosfield--.
Line 61, "is a" should read --a--.

COLUMN 4

Line 30, "are an" should read --an--.
Line 61, "a" should be deleted.

COLUMN 5

Line 11, "sub scanning" should read --sub-scanning--.
Line 16, "exist" should read --exists--.
Line 29, "(sub-scan." should read --(sub-scan--.
Line 33, "sub scanning" should read --sub-scanning--.
Line 34, "(main scan.)" should read --(main scan)--.

UNITED STATES PATENT AND TRADEMARK OFFICE
CERTIFICATE OF CORRECTION

PATENT NO. : 5,812,146

DATED : September 22, 1998

INVENTOR(S) : MAMORU SATO ET AL.

It is certified that error appears in the above-identified patent and that said Letters Patent is hereby corrected as shown below:

COLUMN 6

Line 3, "sinals" should read --signals--.
    Line 8, "sub scanning" should read --sub-scanning--.
    Line 44, "sin," should read --sinø,-.

COLUMN 7

Line 33, "latch 59" should be deleted.
    Line 47, "corresponding" should read --corresponds--.

COLUMN 8

Line 49, "table," should read --tables,--.
    Line 59, "table" should read --tables--.

COLUMN 9

Line 59, "achieved" should read --is achieved--.

UNITED STATES PATENT AND TRADEMARK OFFICE
CERTIFICATE OF CORRECTION

PATENT NO. : 5,812,146

DATED : September 22, 1998

INVENTOR(S): MAMORU SATO ET AL.

It is certified that error appears in the above-identified patent and that said Letters Patent is hereby corrected as shown below:

COLUMN 10

Line 1, "avilable" should read --available--.
Line 15, "light" should read --right--.
Line 22, "stored" should read --store--.
Line 47, "allows to avoid" should read --avoids--.
Line 48, "wherein" should read --wherein are--.
Line 66, "signls:" should read --signals--.

COLUMN 11

Line 1-4,

"   Y    0.3     .59     0.11    R   "
    I    0.6    -0.28   -0.32    G
    Q    0.21   -0.52    0.31    B should read --

$$\begin{pmatrix} Y \\ I \\ Q \end{pmatrix} \begin{pmatrix} 0.3 & 0.59 & 0.11 \\ 0.6 & -0.28 & -0.32 \\ 0.21 & -0.52 & 0.31 \end{pmatrix} \begin{pmatrix} R \\ G \\ B \end{pmatrix}$$

Line 8,  "ect.," should read --etc.,--;
Line 32, "shown are" should read --shown--;
Line 48, "situation" should read --situations--;

COLUMN 12

Line 40, "increses" should read --increases--.
Line 47, "area" should read --areas--.
Line 67, "hte" should read --the--.

UNITED STATES PATENT AND TRADEMARK OFFICE
CERTIFICATE OF CORRECTION

PATENT NO. : 5,812,146
DATED : September 22, 1998
INVENTOR(S): MAMORU SATO ET AL.

It is certified that error appears in the above-identified patent and that said Letters Patent is hereby corrected as shown below:

COLUMN 13

Line 51, "if" should read --is--.
    Line 64, "parameter" should read --parameters--.

COLUMN 14

Line 31, "on the actual" should read --in real time--.

COLUMN 15

Line 43, "ect.," should read --etc.,--.

COLUMN 16

Line 11, "image-" should read --image--.
    Line 45, "permurated" should read --permuted--.
    Line 58, "corresponding" should read --correspond--.

COLUMN 18

Line 6, "enlargment" should read --enlargement--.
    Line 12, "a" should read --$\alpha$--.
    Line 32, "increment in synchronization in main scanning" should read --increment in synchronization in sub-scanning--.
    Line 46, "is said" should read --in the--.
    Line 61, "sub scanning" should read --sub-scanning--.

UNITED STATES PATENT AND TRADEMARK OFFICE
CERTIFICATE OF CORRECTION

PATENT NO. : 5,812,146

DATED : September 22, 1998

INVENTOR(S) : MAMORU SATO ET AL.

It is certified that error appears in the above-identified patent and that said Letters Patent is hereby corrected as shown below:

COLUMN 19

Line 5, "cost," should read --cosø--.
    Line 18, "rhom-" should read --(rhomboid)--;
    Line 19, "boidal" should be deleted.
    Line 65, "by" should read --is obtained by--;

COLUMN 20

Line 4, "rhom-" should read --(rhomboid)--.
    Line 5, "boid" should be deleted.
    Line 22, "permutated" should read --permuted--.

Signed and Sealed this

Sixteenth Day of November, 1999

Attest:

Q. TODD DICKINSON

Attesting Officer      Acting Commissioner of Patents and Trademarks